(12) United States Patent
McKone et al.

(10) Patent No.: US 11,796,114 B2
(45) Date of Patent: *Oct. 24, 2023

(54) ISOLATION PLUG WITH ENERGIZED SEAL

(71) Applicant: TDW Delaware, Inc., Wilmington, DE (US)

(72) Inventors: Thomas H. McKone, Tulsa, OK (US); Cody A. Parsley, Tulsa, OK (US); Keelan J. Prewett, Bixby, OK (US)

(73) Assignee: TDW Delaware, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,419

(22) Filed: Apr. 26, 2021

(65) Prior Publication Data

US 2022/0065380 A1    Mar. 3, 2022

Related U.S. Application Data

(63) Continuation of application No. 16/448,890, filed on Jun. 21, 2019, now Pat. No. 10,989,347.

(Continued)

(51) Int. Cl.
*F16L 55/10* (2006.01)
*F16L 55/132* (2006.01)
(Continued)

(52) U.S. Cl.
CPC .............. *F16L 55/132* (2013.01); *F16K 7/20* (2013.01); *F16L 55/13* (2013.01)

(58) Field of Classification Search
CPC ............ F16L 55/132; F16L 55/13; F16K 7/20
(Continued)

(56) References Cited

U.S. PATENT DOCUMENTS 760,340 A  *  5/1904  Mason ................. F16L 55/134
                                                          138/91
2,612,953 A    10/1952  Morgan et al.
(Continued)

FOREIGN PATENT DOCUMENTS

EP     2378179 A1   10/2011
EP     2716954 A2    4/2014
(Continued)

*Primary Examiner* — James F Hook
(74) *Attorney, Agent, or Firm* — GableGotwals

(57) ABSTRACT

A pipeline isolation tool [10] and method of its use includes a plugging head [20] having a seal [30] to sealably engage a pipe wall; a fluid-activated cylinder [64] located on one side of the seal and moveable in an axial direction; metal support segments [40] located on another side of the seal and moveable in a transverse direction radially outward and inward; the metal segments including a concave portion [45], a portion [35] of the seal residing within the concave portion when unset and set. When in a seal unset position a portion [33] of the seal is covered by adjacent metal support segments of the plurality. When in a seal set position the portion of the seal is exposed between the adjacent metal support segments. The seal is self-energizing, its actuating force being in a same direction as a force from isolation pressure.

24 Claims, 18 Drawing Sheets

Related U.S. Application Data

(60) Provisional application No. 62/689,527, filed on Jun. 25, 2018, provisional application No. 62/688,875, filed on Jun. 22, 2018.

(51) Int. Cl.
*F16K 7/20* (2006.01)
*F16L 55/13* (2006.01)

(58) Field of Classification Search
USPC .......................................... 138/89, 92, 94, 91
See application file for complete search history.

(56) References Cited

U.S. PATENT DOCUMENTS

| | | | |
|---|---|---|---|
| 3,025,885 A | | 3/1962 | Ver Nooy |
| 3,062,295 A | * | 11/1962 | Hanes ................... E21B 33/128 166/63 |
| 3,626,475 A | | 12/1971 | Hicks |
| 4,658,860 A | | 4/1987 | Reaux |
| 4,830,334 A | * | 5/1989 | Welker ................ F16K 31/1228 251/63.5 |
| 5,293,905 A | | 3/1994 | Friedrich |
| 7,546,847 B2 | | 6/2009 | Morrison et al. |
| 8,307,856 B2 | | 11/2012 | Yeazel et al. |
| 9,746,088 B2 | | 8/2017 | Odori |
| 2008/0017390 A1 | | 1/2008 | Bowie |
| 2009/0114302 A1 | | 5/2009 | Yeazel et al. |
| 2009/0272451 A1 | | 11/2009 | Aleksandersen et al. |
| 2010/0032044 A1 | | 2/2010 | Mellemstrand et al. |
| 2010/0133864 A1 | | 6/2010 | Syse |
| 2019/0107239 A1 | | 4/2019 | Bjorsvik et al. |
| 2019/0390814 A1 | | 12/2019 | McKone et al. |

FOREIGN PATENT DOCUMENTS

| | | |
|---|---|---|
| IE | 20110157 | 3/2012 |
| RU | 177026 U1 | 2/2018 |
| WO | 0201174 A1 | 1/2002 |
| WO | 2022026919 A1 | 2/2022 |

* cited by examiner

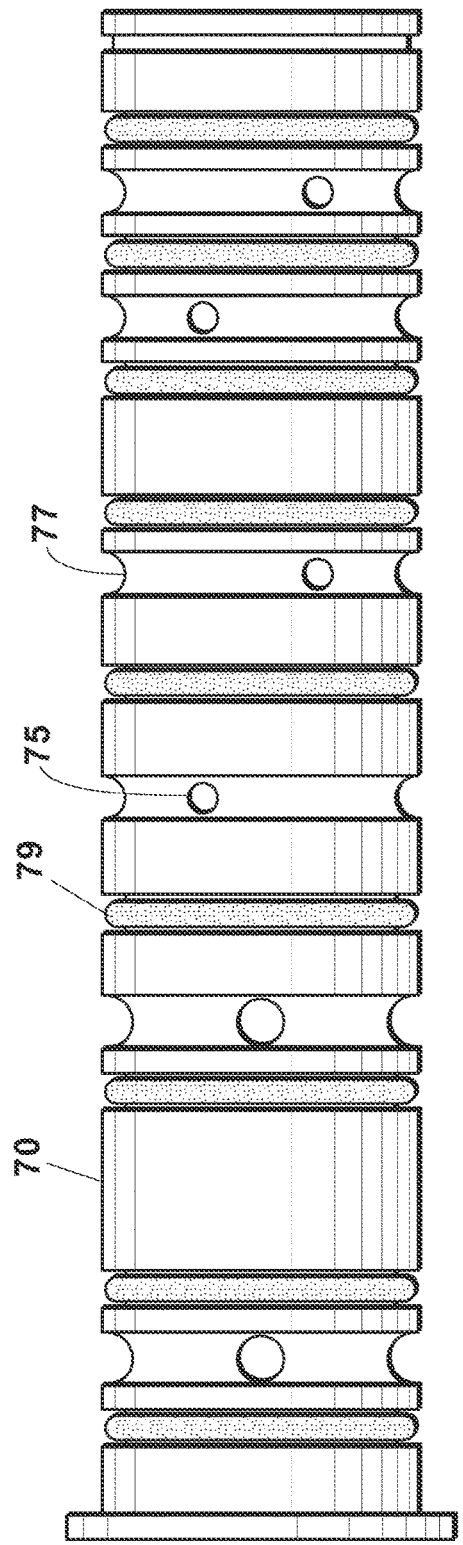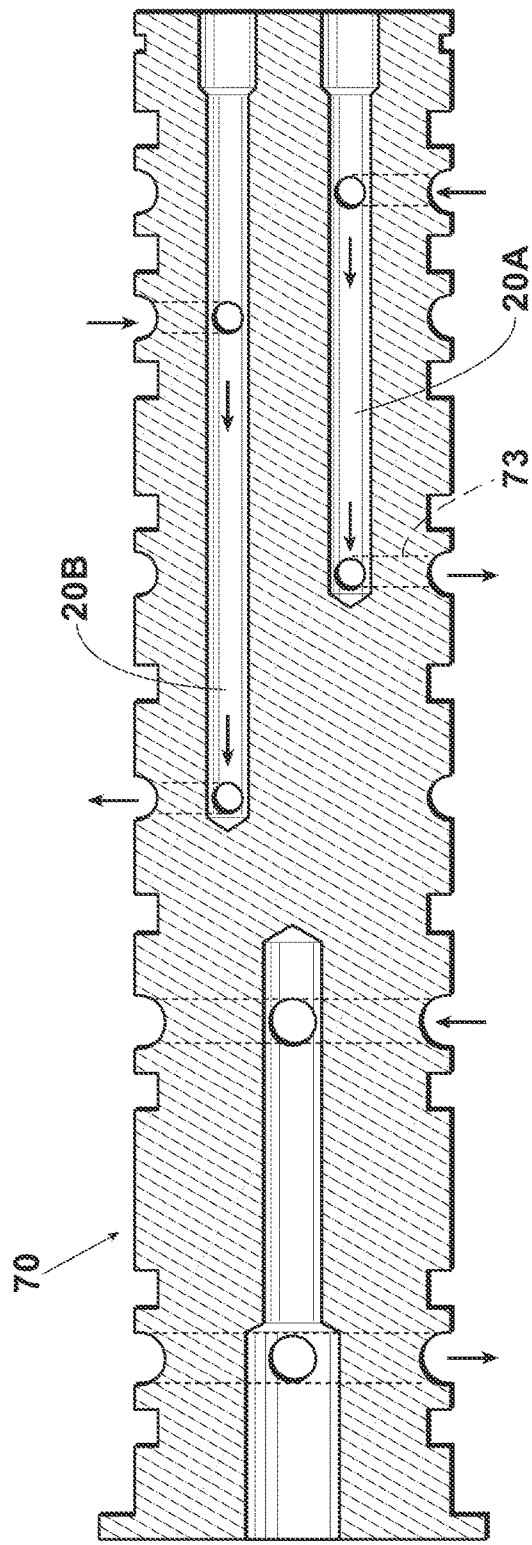
Fig. 5A
Fig. 5B

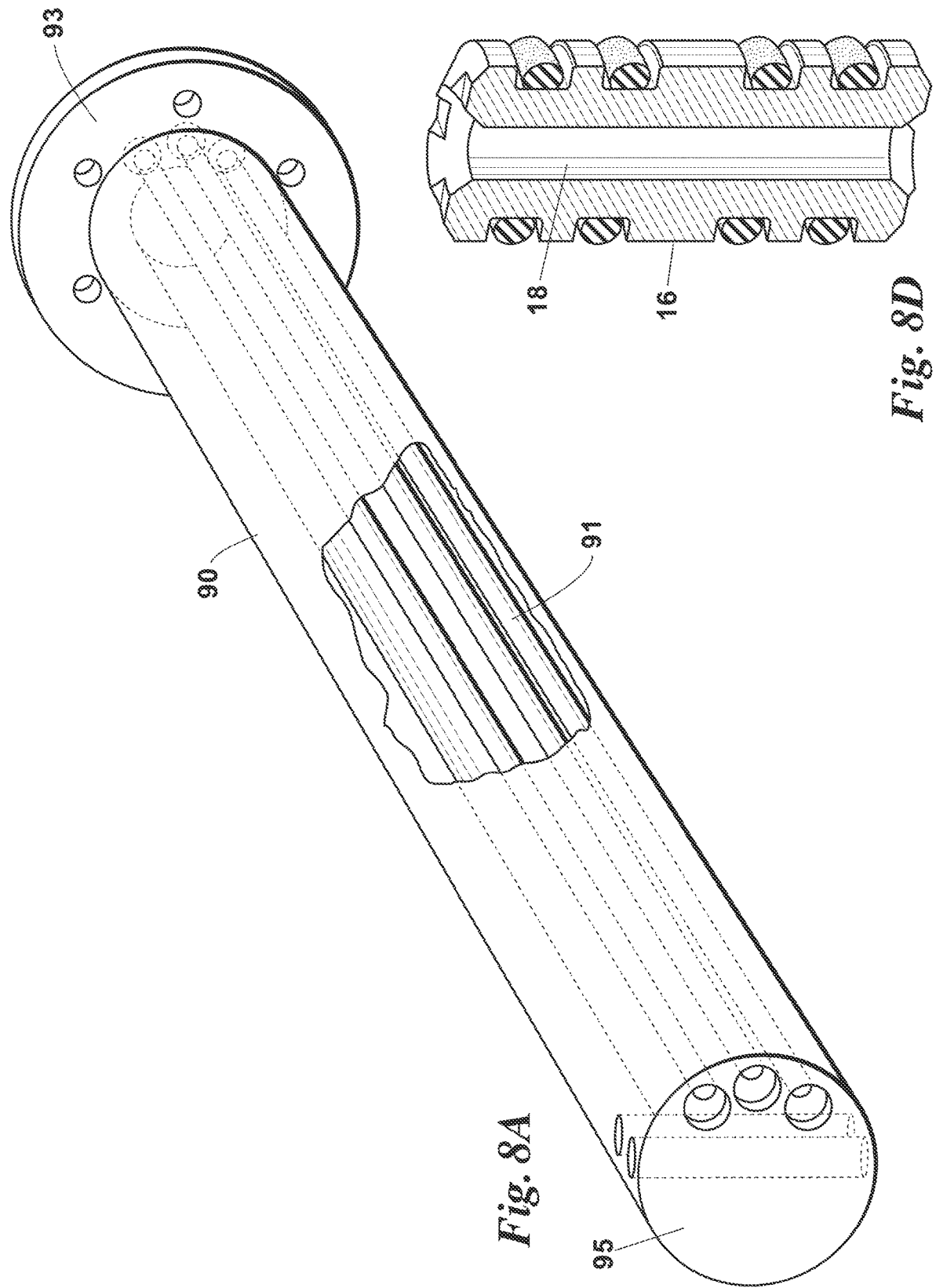

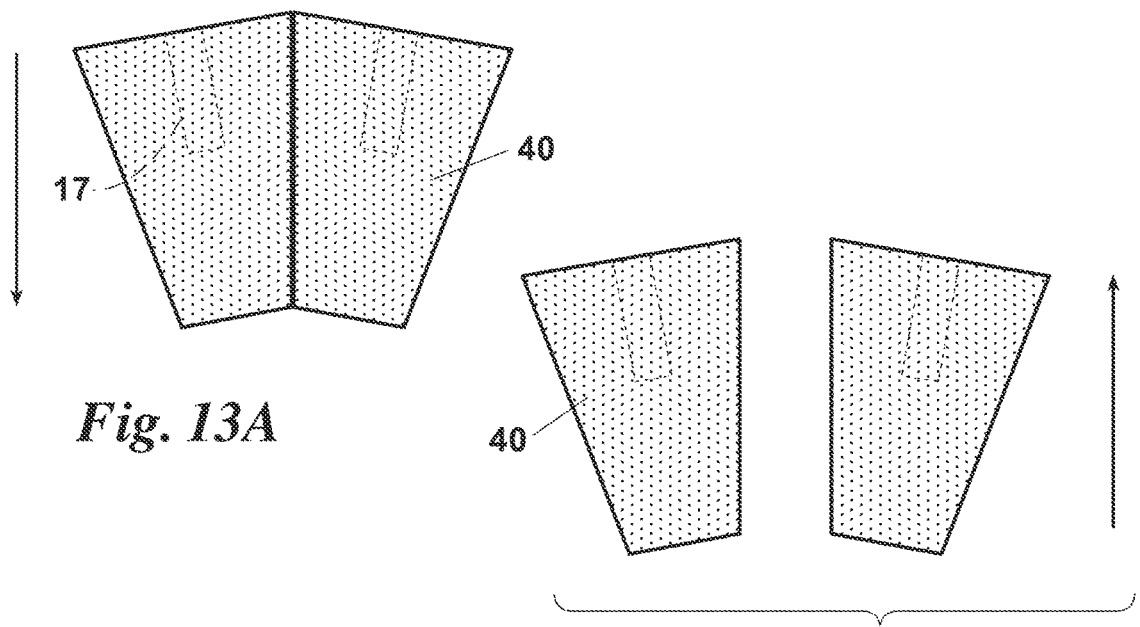
*Fig. 13A*
*Fig. 13B*
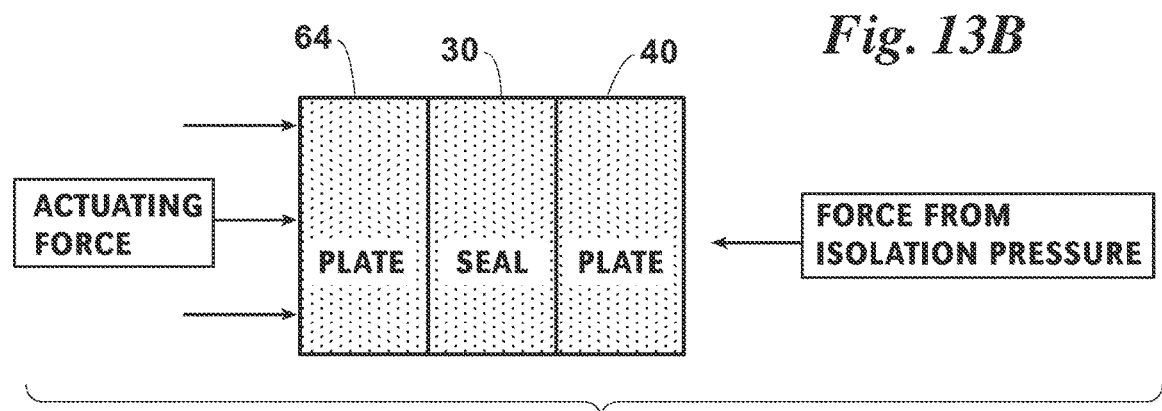
*Fig. 14A*
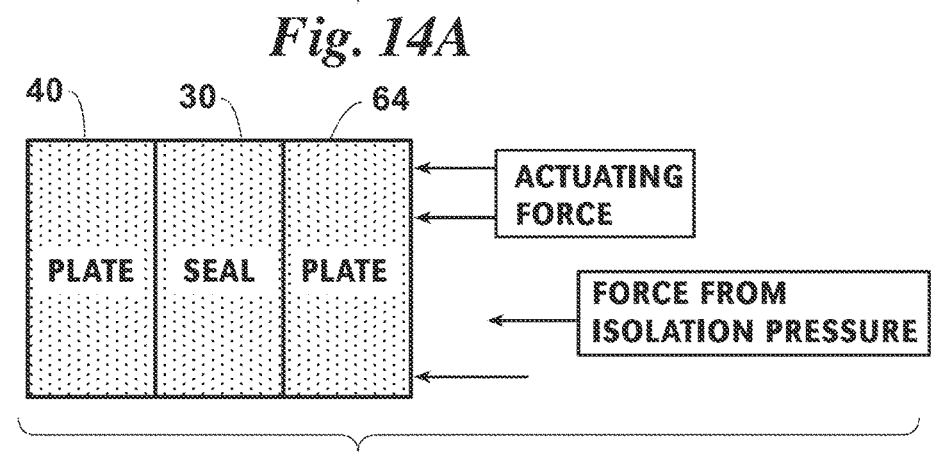
*Fig. 14B*

ISOLATION PLUG WITH ENERGIZED SEAL

CROSS-REFERENCE TO CO-PENDING APPLICATIONS

This application is a continuation of U.S. Ser. No. 16/448,890, filed Jun. 21, 2019 and which issued as U.S. Pat. No. 10,989,347 B2, which in turn claims priority to U.S. Provisional Application Nos. 62/688,875 filed Jun. 22, 2018 and 62/689,527, filed Jun. 25, 2018, all of which are incorporated herein by reference.

BACKGROUND

This disclosure is in the field of systems, devices, and methods that make use of expanding seals to isolate a section of pressurized pipe as part of a hot tapping operation.

Example isolation tools with an expanding seal may be found in U.S. Pat. No. 8,307,856 B2 to Yeazel, titled Double Block and Bleed Plug, and U.S. Pat. No. 9,746,088 B2 to Odori, titled Device for Sealing Pipelines. The content of each is hereby incorporated by reference.

SUMMARY

Embodiments of an isolation tool of this disclosure are configured to isolate a section of pressurized pipe using an expanding, reusable seal that provides sealing engagement over a wide range of pipe wall thicknesses of a nominal pipe outer diameter. The seal may be a dual durometer seal, having a softer outer surface than its core. A set diameter of the seal may be, for example, in a range of 1.13 to 1.30 of its diameter when in an unset position. The seal makes use of segments that support the seal but do not fully enclose the seal, being open on one side. Actuation forces needed to expand the seal are applied to the seal rather than to the support segments. In embodiments, the tool may be used in size-on-size applications and in reduced branch applications.

In some embodiments, an hydraulically actuated piston-and-cylinder arrangement compresses the seal axially, thereby expanding the seal radially outward toward an opposing inside diameter to a pipe. The piston-and-cylinder arrangement may be configured to move axially in the direction of the isolated section of pipe (making the seal self-energizing). Hydraulic transfer may be contained within the control bar head, plugging head joint, and plugging head. In some embodiments, fluid is transferred through the joint using a transfer pin containing longitudinally and laterally extending fluid passageways and circumferential grooves. Fluid may be transferred between longitudinal fluid passageways of adjacent components through a transfer pin containing an longitudinally extending passageway.

In embodiments, a first seal-facing surface may be found on a first plate configured for axial or longitudinal movement toward an expandable sealing element and a second seal-facing surface may be found on a second plate configured for transverse movement radially upward and downward (or outward and inward) relative to the expandable sealing element. In some embodiments, the first plate is part of a fluid-actuated piston-and-cylinder arrangement. The second seal-facing surface may be found on metal plates or support segments spaced about the sealing element. The segments rest against and ride on a segment plate that provides a track for each segment to guide the segment as it moves radially outward and inward. As the first seal-facing surface moves axially, the second seal-facing surface moves transversely, sliding radially with the seal as it expands and supporting the seal against differential pressure.

The metal support segments may have a profile that includes a plurality of upwardly inclined surfaces that function as thrust surfaces to maintain engagement between the segment and the seal. One or more of the surfaces may be located in a cavity or recess into which a portion of the seal resides when in an unexpanded (unset) and an expanded (set) state. The surfaces provide increased contact area with the seal when in the unset state, as it transitions between the unset and set states, and when in the set state.

The tool may be a double block and bleed tool and include a primary plugging head pivotally connected to the control bar head and a secondary plugging head pivotally connected to the primary plugging head. A respective joint or hinge of each head includes a pin containing fluid passageways. The use of two pivoting plugging heads can provide larger spacing between the heads and, therefore, a larger zero-energy zone. In embodiments, the plugging heads are spaced apart such that there is always a sufficient volume between the plugging heads such that the heads or sealing elements cannot come into contact with another when the sealing element is in an expanded state.

Hard stops may be included that place the plugging heads in a correct orientation and control plugging head movement for smoother insertion into the line. The connection between the heads may be configured to maintain the secondary head at a suitable angle during insertion and subsequent pivoting into a sealing position within the pipe.

The feet of the control bar head may rest on the side of the inside diameter of the pipe to secure the plugging head or primary and secondary plugging heads in the line. By resting on the side of the pipe, rather than on the bottom, the primary plugging head hinge may be made narrower for easier insertion and retraction. Due to pipe wall thickness variance, the control bar head does not necessarily locate such that the centerline of the seal aligns with the centerline of the pipe, therefore the seal must overcome axial misalignment and provide effective isolation.

In some embodiments, the tool may include a sweep with a curved profile mounted at a forward end of the tool to push chips and other debris away from sealing surfaces during insertion and positioning in the line, making it easier for the expanding, reusable seal to form a seal against the interior diameter of the pipe. The sweep may be a flexible disc of a urethane material. In embodiments, the sweep may include a plurality of ribs that help reduce friction during sweeping The use of the sweep eliminates the need for magnets to remove chips and debris.

In embodiments, a pipeline isolation tool of this disclosure includes at least one plugging head including a seal configured to sealably engage a pipe wall and expandable between an unset and a set position; a fluid-activated cylinder located on one side of the seal and moveable in an axial direction, the fluid-activated cylinder including a first seal-facing surface contacting an opposing sidewall of the seal; a plurality of metal support segments located on a side of the seal opposite that of the fluid-activated cylinder and moveable in a transverse direction radially outward and inward as the seal moves between the unset and set positions; each metal support segment of the plurality including a second seal-facing surface contacting another opposing sidewall of the seal, the second seal-facing surface including a concave portion, a portion of the another opposing sidewall of the seal residing within the concave portion; wherein in the unset position a portion of the seal is covered by adjacent metal support segments of the plurality; and wherein in the set position the portion of the seal is exposed between the adjacent metal support segments. A second plugging head including these features may be connected to the at least one plugging head. The connection may be a pivotal connection.

The plugging head may include a sweep having a curved lower end. The curved lowered end of the sweep may be located below the at least one plugging head when the seal is in an unset position within an interior of the pipe and forward of the head when the seal is in the set position within the pipe. Multiple sweeps may occur as the plugging head is lowered, raised or partially raised, and lowered again into the interior of the pipe prior to setting the seal. The sweep may include a plurality of ribs located on a forward surface of the sweep to reduce friction during sweeping.

The plugging head may include a hinge containing a transfer pin including a plurality of fluid passageways, with the plugging head being in pivotal relation to the hinge. At least one fluid passageway of the plurality of fluid passageways may be a hydraulic fluid passageway to supply hydraulic fluid to the fluid-actuated cylinder. At least one other fluid passageway of the plurality of fluid passageways may be a gas passageway that allows for bleeding of pipeline product.

The seal may be a dual durometer seal, with an outer pipe wall facing portion having a first shore hardness and another portion inward of the outer pipe wall facing portion having a second greater shore hardness.

The pipeline isolation tool may include a control bar head connected to the at least one plugging head, the control bar head including a pair of spaced-apart feet located at a lower end of the control bar head, one foot of the pair lying left of a vertical centerline of the control bar head and another foot of the pair lying right of the vertical centerline. The feet are spaced so that the head contacts a sidewall portion of the pipe rather resting on the bottom of the pipe. The control bar head may include a stop configured to prevent rotation and orient the at least one plugging head in a first orientation during run-in to an interior of a pipe and at second different orientation when in the pipe.

In embodiments of a method of blocking an interior of a pipe using a pipeline isolation tool of this disclosure, the method includes lowering the plugging head through an access opening to the interior of the pipe; after the lowering, orienting the plugging head into a predetermined orientation within the interior of the pipe; and after the orienting, expanding a seal of the at least one plugging head between an unset and a set position, the seal being in sealing engagement to an opposing pipe wall when in the set position. During the orienting, the method may include sweeping debris located within the interior of the pipe below the access opening forward of the at least one plugging head during the orienting of the at least one plugging head. The method may also include rotating the plugging head about the pin during the orienting. Where a second plugging head is used, that head is also rotated. The sweep is located on the leading, rather than the trailing head.

Technical effects accomplished by the embodiments of this disclosure include, but are not limited to, the following effects: a dual durometer seal that optimizes extrusion and sealing capabilities; metal plates or metal support segments including a unique profile that is highly effective in expansion and retraction of the seal, provides support to and sealing engagement with the seal over the extrusion gap, and allows for a larger range of extrusion (e.g. 1.13 to 1.30) with higher pressure retention capabilities; a control bar head that does not rest on the bottom of the pipe and includes anti-rotation features; and a sweep that moves away chips and debris during tool insertion rather than requiring other tools and procedures and provides an improved sealing surface of the pipe to be presented to the seals.

BRIEF DESCRIPTION OF THE DRAWINGS

FIG. 5A is an embodiment of a transfer pin of this disclosure. In order to avoid external hydraulics, hydraulic transfer may be contained within the control bar head and the plugging heads. Fluid may be transferred through joints using the transfer pin. The transfer pin does not free-spin and moves two separate fluids, a gas and a liquid, in both upstream and downstream directions. In embodiments, two transfer pins are used with one of the fluids traveling through both pins. Note the bleed port is not always transferring a gas and may transfer a liquid or some combination of the two.

FIG. 5B is a cross-section view of the transfer pin of FIG. 5A. Hydraulics move internally through the pin and externally through grooves along the outside diameter of the pin, contained by o-rings located on either side of the groove (see e.g. FIG. 5A showing o-rings).

FIG. 8A is an embodiment of a control bar of this disclosure. The control bar may include three hydraulic bores that span its entire length, allowing hydraulics to be pumped into the plugging heads through the top of the control bar and pipeline fluid to be bled from the plugging head out of the top of the control bar.

FIG. 8D is a cross-section view of an embodiment of a transfer pin that is received by a transfer pin port. The pin includes a longitudinally extending passageway that permits transfer of fluid between adjacent components and a plurality of grooves each with an o-ring.

FIG. 13A is a schematic of adjacent metal support segments when the seal is in a de-energized state.

FIG. 13B is a schematic of the adjacent metal support segments of FIG. 13A when the seal is in an energized state.

FIG. 14A is a schematic depicting an expandable seal with an actuation mechanism configured for self-deenergizing when setting the seal.

FIG. 14B is a schematic depicting an expandable seal with an actuation mechanism configured for self-energizing when setting the seal.

ELEMENTS AND NUMBERING USED IN THE DRAWINGS AND DETAILED DESCRIPTION

Figure 1:
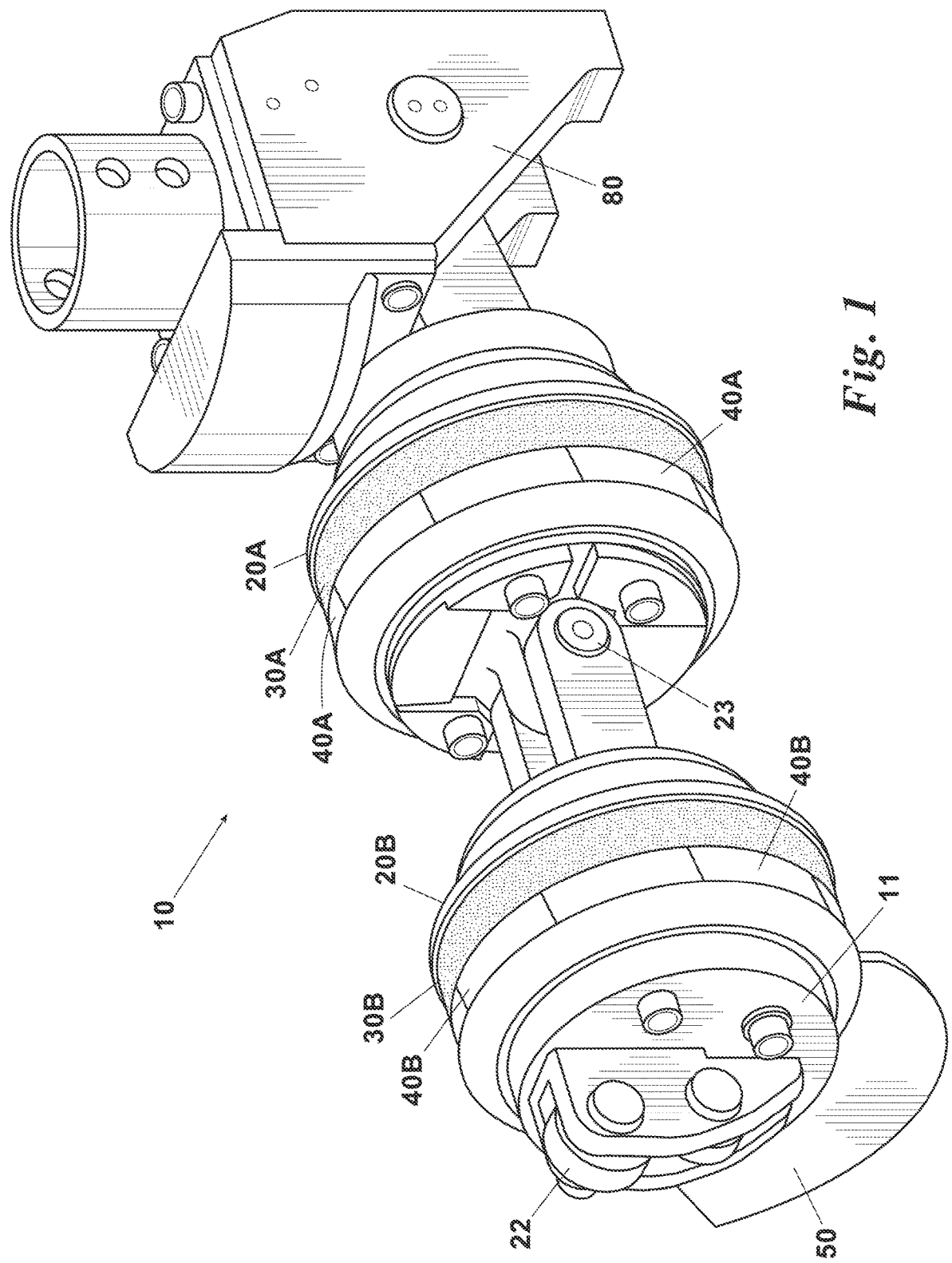
FIG. 1 is an isometric view of an embodiment of an isolation plug of this disclosure. The plug may be inserted into a section of pressurized pipe with or against a direction of pipeline flow.
Figure 2:
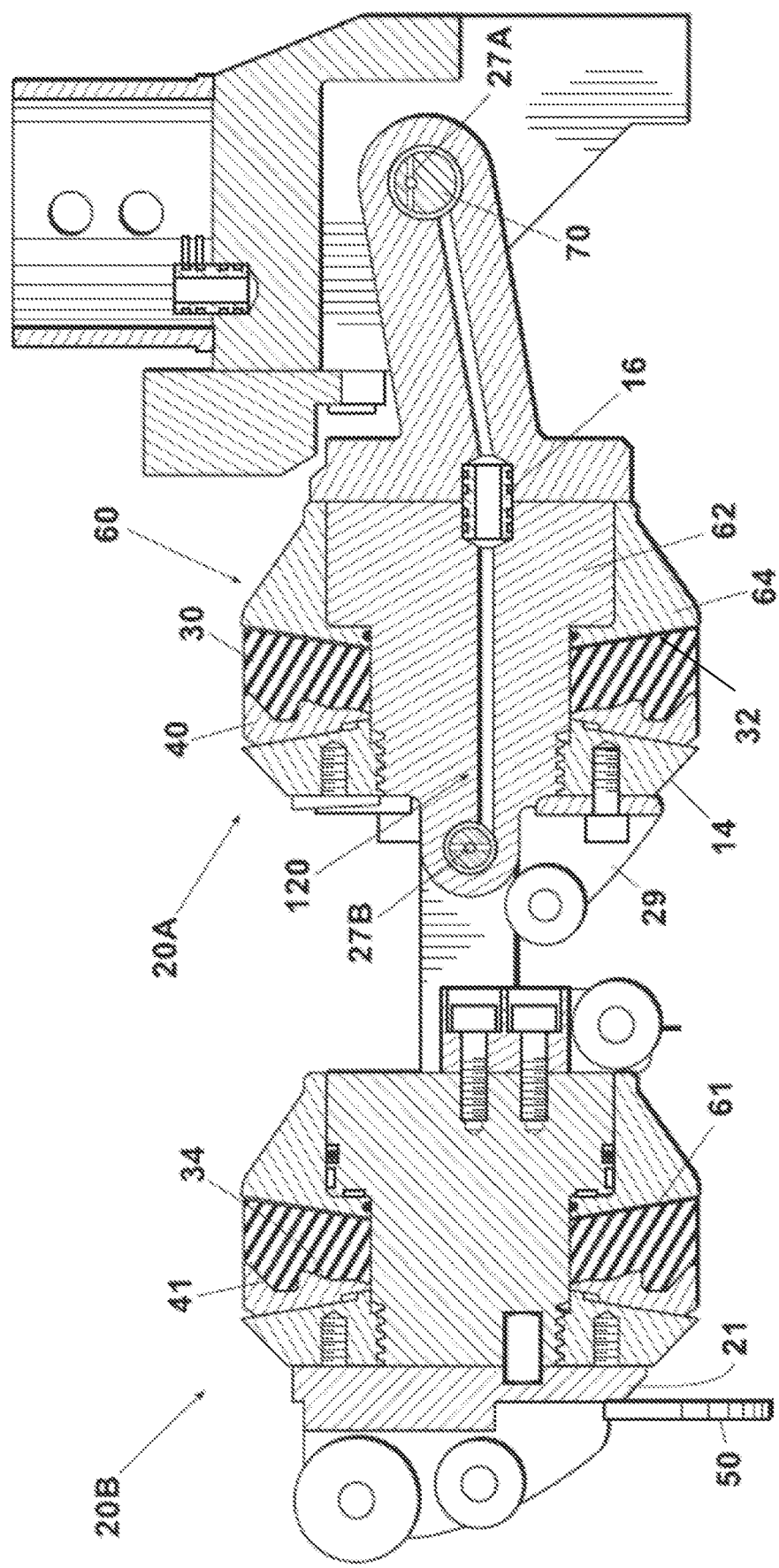
FIG. 2 is a cross-section view of an embodiment with the sealing elements in a retracted (unexpanded), run-in state.
Figure 3:
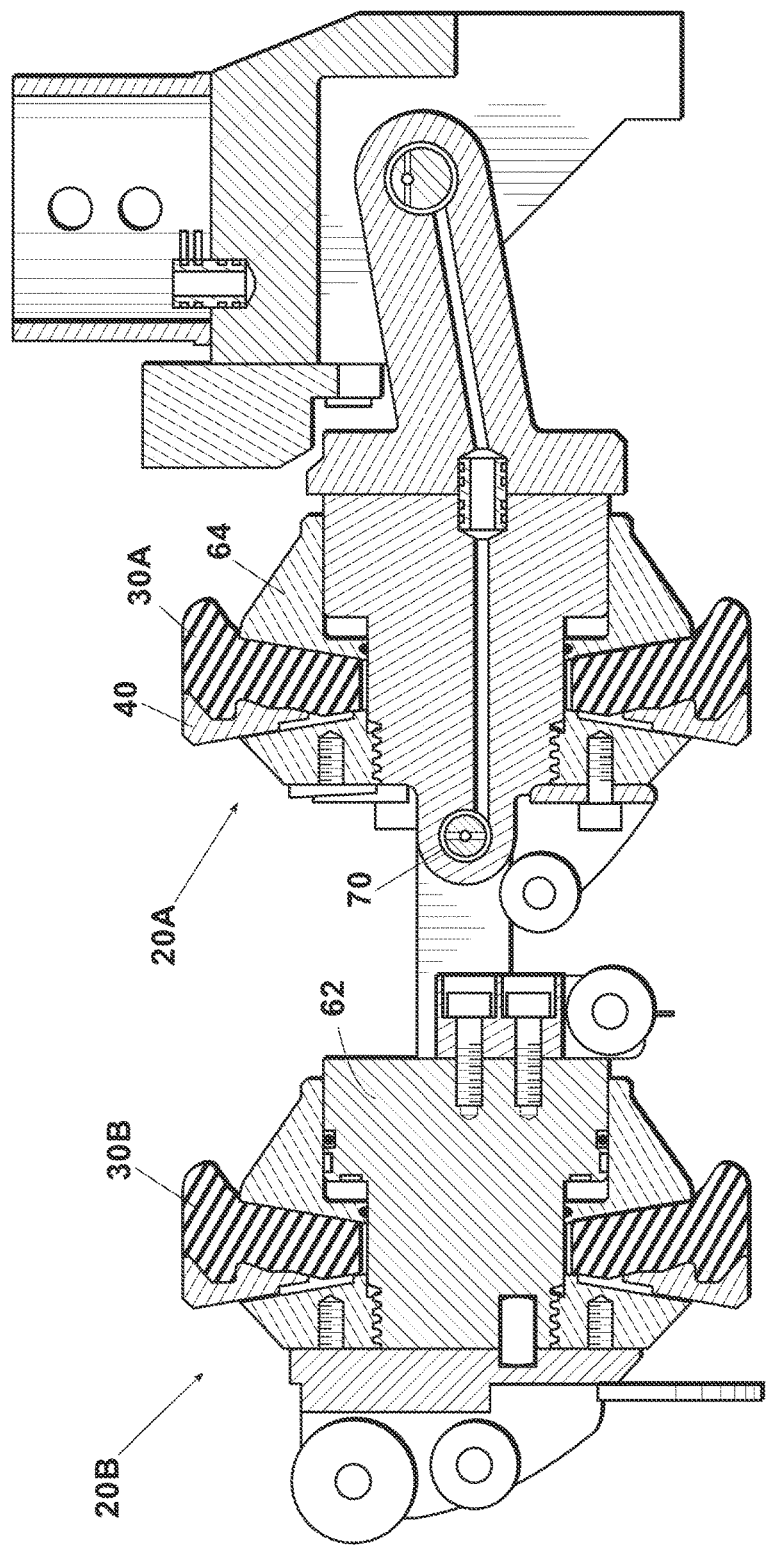
FIG. 3 is a cross section view of an embodiment with the sealing elements in an expanded, fully deployed state. Metal support segments slide radially with the seal.

10 Pipeline isolation tool
11 Forward end
14 Segment plate
15 Actuator
16 Transfer pin
17 Track guide
18 Longitudinally extending fluid passageway
15 Actuator
20 Plugging head
21 Lower end
22 Guide or guide wheel
23 Hinge
25 Centerline
27 Fluid passageway
29 Stop
30 Seal
32 Sidewall or side
33 Portion covered by 40 when unset and uncovered when set
34 Sidewall or side 35 Portion contained by 45
36 Centerline
38 Band of harder core material
39 Band of softer core material
40 Metal segment
41 Second seal-facing surface
42 Lower half
43 Surface
44 Upper end
45 Concave portion (cavity or recess)
46 Plate
47 Lower end
48 Bottom end of 45
49 Upper end of 45
50 Sweep
51 Bottom end or edge
53 Ribs
60 Piston-and-cylinder arrangement
61 First seal-facing surface
62 Piston
63 Plate
64 Cylinder
65 Inclined planar surface
67 Upper end
69 Lower end
70 Transfer pin
71 Longitudinally extending fluid passageway
73 Laterally extending fluid passageway
75 Port
77 Groove
79 O-ring
80 Control bar head
81 Feet
82 Longitudinally extending fluid passageway
83 Lower end
85 Bottom
87 Stop
89 Vertical centerline
90 Control bar
91 Longitudinally extending fluid passageways
93 Upper end
95 Lower end
100 Feed nut
102 Longitudinally extending fluid passageway
120 Internal actuating fluid circuit 120

DETAILED DESCRIPTION

The following embodiments provide examples, arrangements, or designs of a pipeline isolation tool of this disclosure. Referring first to FIGS. 1-3, 5 & 6, when in an intended use, the tool 10 is inserted through a fitting and a tapped access hole to an interior of a pipe and then rotates to orient a plugging head 20 or heads into a sealing position. During insertion, a sweep 50 having a curved bottom 51 and located at a forward end 11 of the tool 10 may be used to push chips and debris forward and away from the sealing surfaces of the head 20 prior to those surfaces engaging the pipe wall. A hydraulic pump may be used to activate a piston-and-cylinder arrangement 60 that compresses each seal 30 of a head 20 axially so that the seal 30 expands radially outward, sealing against the pipe wall. As the seal 30 expands radially outward, metal support segments 40 move radially outward and support the seal 30 against the differential pressure. The isolated section is then vented or drained and, in the case to two plugging heads 20A & B, the volume between the plugging heads 20A & B is vented or drained out through the tool 10 (to provide double block and bleed). Once operation on the isolated section of the line is concluded, the pressure is balanced, the seals 30A & B are deactivated, and the tool 10 is retracted through the tapped hole and the fitting. The fitting is typically a saddle branch fitting that provides a lateral access connection to the pipe and may be a size-on-size fitting. In some embodiments, the fitting is a reduced branch fitting.

Embodiments of a pipeline isolation tool 10 of this disclosure may include a primary plugging head 20A connected by a hinge 23A to a control bar head 80 that includes a stop 87 to orient the primary plugging head 20A in an off-vertical orientation during run-in through the lateral access connection to a pressurized section of pipe and in a proper orientation for rotation into a sealing position. The plugging head 20A, the hinge 23A, and the control bar head 80 may each contain internal fluid passageways 71, 82 in communication with one another. The primary plugging head 20A may include an expandable seal 30A located between and in contact with a first or seal-facing surface or plate 61 of the piston-and-cylinder arrangement 60 and a second seal-facing surface or plate 41 of the metal support segments 40. As used in this disclosure, seal-facing means a surface facing and in contact with at least a sidewall portion of the seal 30. The first seal-facing surface 61 is located on one side of the seal 30 and contacts an opposing sidewall 32 of the seal 30. The second seal-facing surface 41 is located on another side of the seal 30 and contacts another opposing sidewall 34 of the seal 30.

Figure 11A:
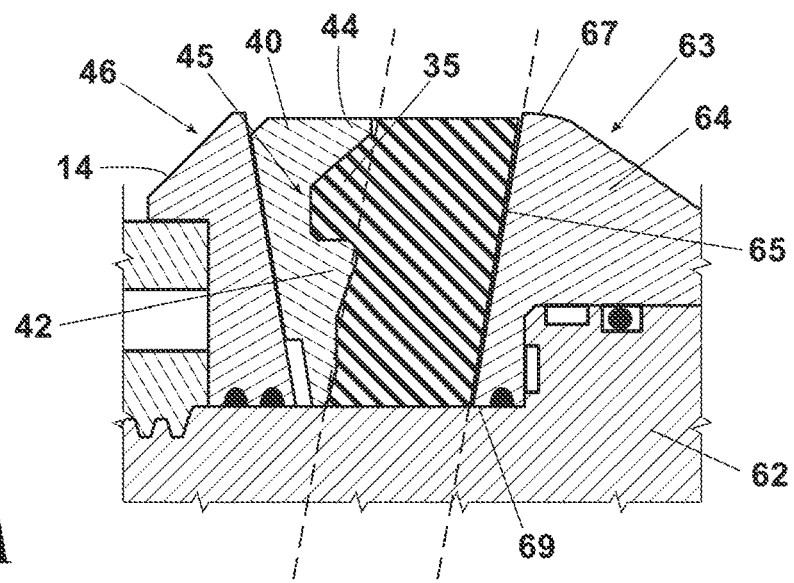
FIG. 11A is a cross-section view of an embodiment of a metal support segment and seal of this disclosure with the seal in an unexpanded state. A seal-facing lower surface of the segment runs substantially parallel to a seal-facing surface of the moveable plate or cylinder. A plurality of upwardly inclined surfaces function as thrust surfaces to help maintain seal engagement between the segment and the seal as the seal transitions to the set state (e.g. moving radially upward). The moveable plate or cylinder may be a full circumferential plate.
Figure 11B:
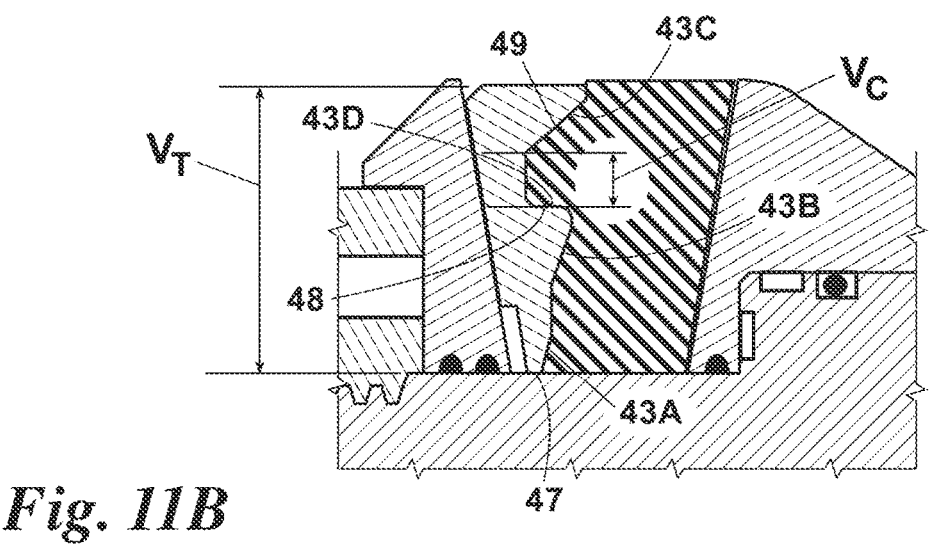
FIG. 11B is another cross-section view of the metal support segment and seal of FIG. 11A. A total height of the segment is proportional to a total height of a seal-facing cavity or recessed portion of the segment.
Figure 11C:
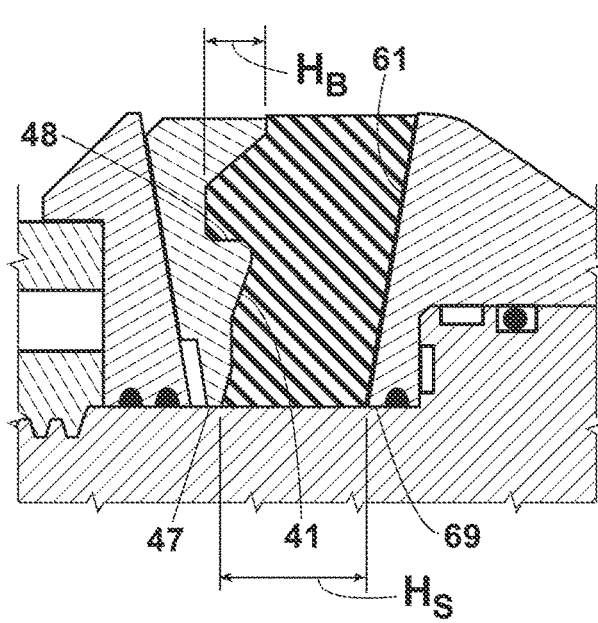
FIG. 11C is another cross-section view of the metal support segment and seal of FIG. 11A. A total depth of an lower end of the cavity is proportional to a total distance between the bottom end of the segment and the cylinder. The surface of this lower end maintains engagement with the seal as the seal transitions to the unset state (e.g. moving radially downward).
Figure 11D:
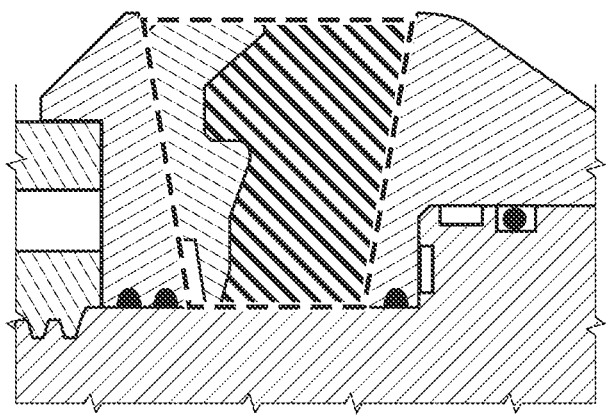
FIG. 11D is another cross-section view of the metal support segment and seal of FIG. 11A. In an unexpanded state, the metal segment and seal form an isosceles trapezoidal-shape.
Figure 11E:
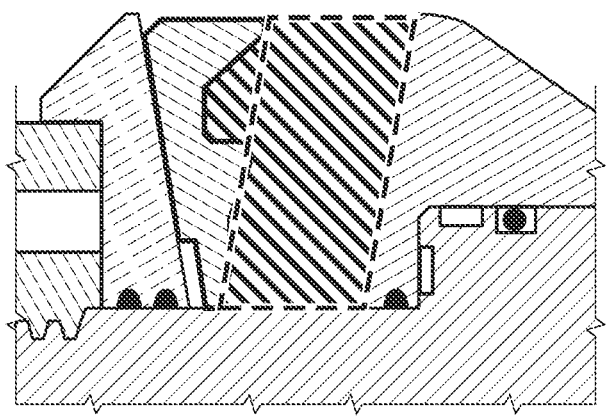
FIG. 11E is another cross-section view of the metal support segment and seal of FIG. 11A. The metal segment is generally triangular-shaped with a quadrilateral-shaped cavity or recessed portion along its seal facing side.
Figure 12A:
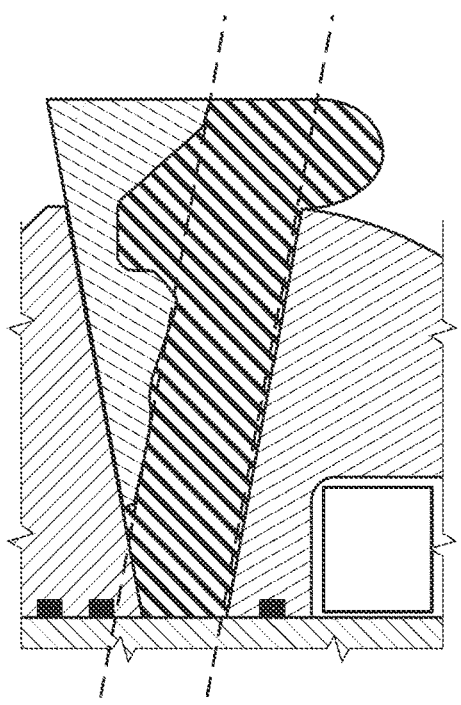
FIG. 12A is a cross-section view of an embodiment of a metal support segment and seal of this disclosure with the seal in an expanded state. A seal-facing lower surface of the segment runs substantially parallel to a seal-facing surface of the cylinder.
Figure 12B:
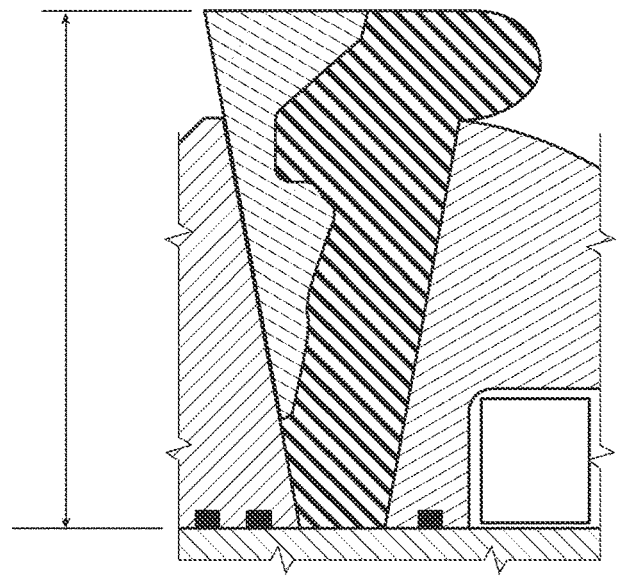
FIG. 12B is another cross-section view of the metal support segment and seal of FIG. 12A. A total height of the segment is proportional to a total height of a seal-facing cavity or recessed portion of the segment.
Figure 12C:
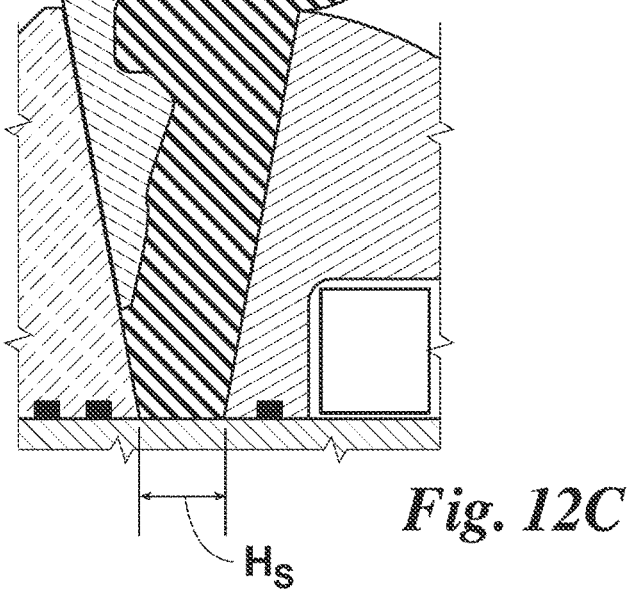
FIG. 12C is another cross-section view of the metal support segment and sea of FIG. 12A. A total depth of an lower end of the cavity is proportional to a total distance between the bottom end of the segment and the cylinder. The surface of this lower end maintains engagement with the seal as the seal transitions to the unset state (e.g. moving radially downward).
Figure 12D:
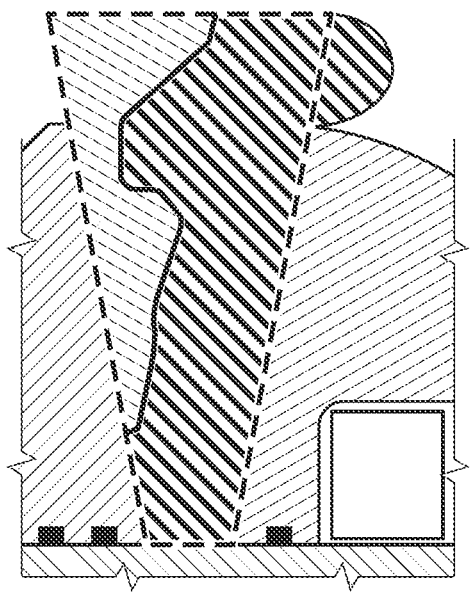
FIG. 12D is another cross-section view of the metal support segment and seal of FIG. 12A. In an unexpanded state, the metal segment and seal form an isosceles trapezoidal-shape.
Figure 12E:
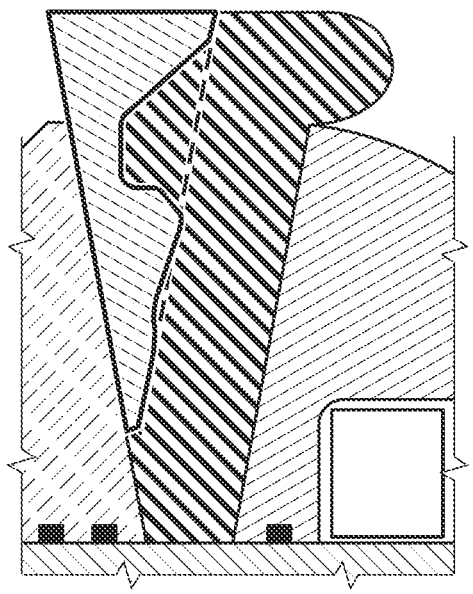
FIG. 12E is another cross-section view of the metal support segment and seal of FIG. 12A. The metal segment is generally triangular-shaped with a quadrilateral-shaped cavity or recessed portion along its seal facing side.
Figure 15:
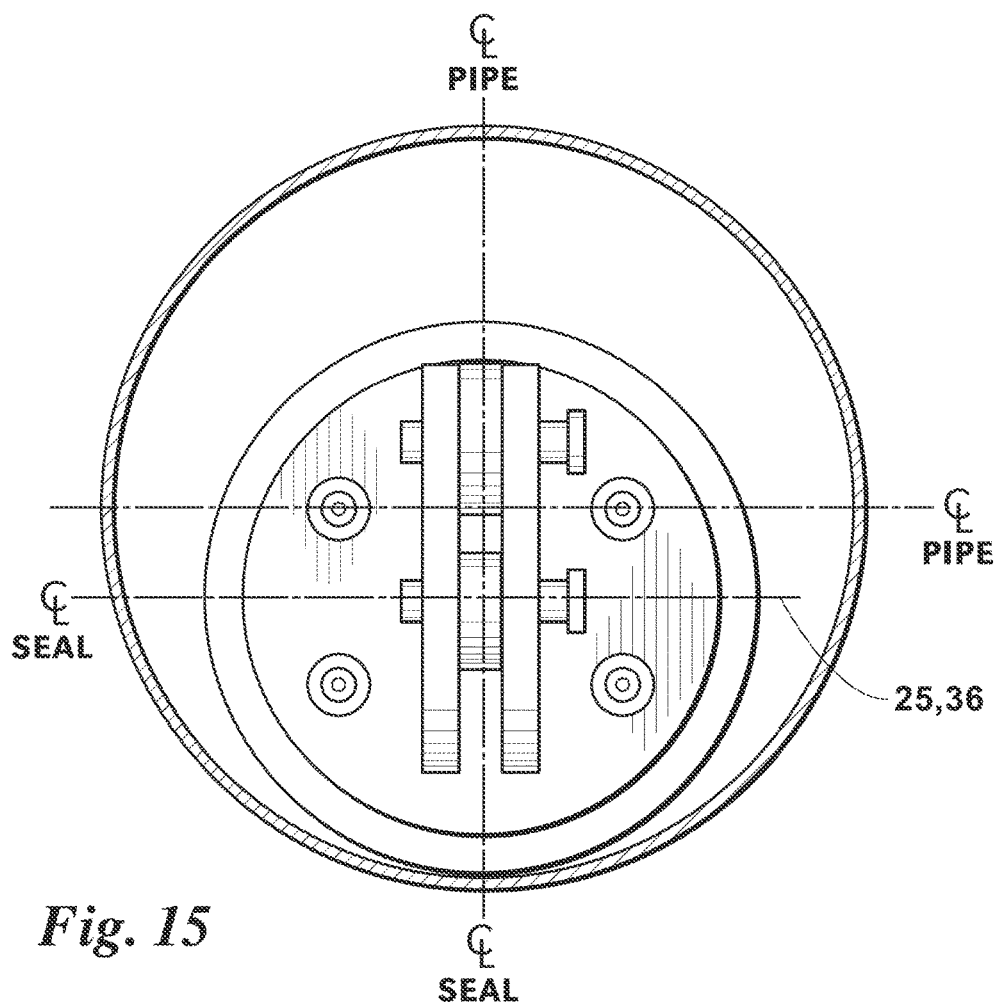
FIG. 15 is an embodiment of a sealing element of this disclosure in an unexpanded state, illustrating the seal lying below a centerline of the pipe.
Figures 16A, 16B, 16C:
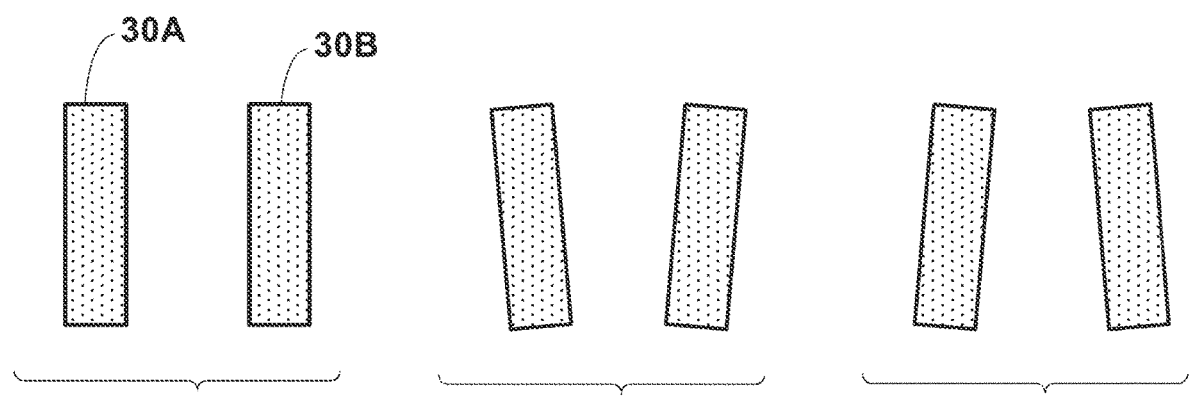
FIGS. 16A to 16C are schematics illustrating seal position during axial alignment (FIG. 16A) and misalignment (FIGS. 16B & 16C). Embodiment of this disclosure can accommodate misalignment due, at least in part, to varying pipe wall thickness.

The first seal-facing surface 61 may be configured for axial movement, the second seal-facing surface 41 may be configured for transverse movement. The axial movement, which is generally horizontal, may be in a same direction as a force from the isolation pressure, thereby making the seal 30 self-energizing. See e.g. FIGS. 14A & B. The transverse movement, which is substantially radial with respect to a pipeline or plugging head centerline 25, permits the second seal-facing surface 41 to move radially with the seal 30 as the seal 30 moves between the unset (retracted) and set (expanded) states. For example, in some embodiments, the transverse movement may be in a range of 1° to 15° off vertical, there being discrete values and subranges within this broader range. See e.g., FIGS. 13A & B. In embodiments, a fluid-activated cylinder 64 may contain the first seal-facing surface 61 and; a metal support segment 40 may contain the second seal-facing surface 41. The metal support segment 40 may, when moving radially, move at an angle off vertical. The segments 40 rest or ride against a segment plate 41 including a plurality of facets that each include a track or slot (not shown) in which a track guide 17 of the segment 40 is placed. See e.g. FIGS. 11A and 13A & B.

Referring to FIGS. 11A-12E, the second seal-facing surface 41 may include a plurality of surfaces 43A-D oriented to maintain seal engagement during transitions between seal 30 unset and set positions. One or more of the surfaces 43A-D may be located in a cavity or recess (concave portion) 45 of the second seal-facing surface 41 that contains a portion 35 of the expandable seal 30. In some embodiments, the second seal-facing surface 41 includes three upwardly inclined surfaces 43A-C that function as thrust surfaces as the seal 30 expands outwardly. Two surfaces 43A & B of the three surfaces 43A-C may be located between a lower end or face 47 and cavity 45 of the seal-facing surface 41. The third surface 43C may form an upper end or face 49 of the +cavity 45. Another surface 43D lying opposite this third surface 43C may form a bottom end or face 48 of the cavity 45. The surfaces 43A-D provide increased contact area with the seal 30 as it transitions between the unset and set states and when in the set state.

Referring again to FIGS. 1 & 6, embodiments of the pipeline isolation tool 10 may also include a secondary plugging head 20B connected by a hinge 23B to the primary plugging head 20A, the secondary plugging head 20B and its hinge 23B containing at least one fluid passageway 27B in communication with one of the primary plugging head's fluid passageways 27A. The primary plugging head 20A may include a stop 29 to orient the secondary plugging head 20B in an off-vertical orientation during the run-in so that it is at a proper orientation for rotation into a sealing position. In some embodiments, the primary and second plugging heads 20 lie entirely within a cylinder defined by an inside diameter of the lateral access connection during run-in and until a guide or guide wheel 22 of the secondary plugging head 20B contacts a bottom of the pipe.

The spacing between the plugging heads 20 may be greater than a length of ribbon that results from a tapping operation which provides the access hole to the pipe interior. The ribbon length is typically no more than the diameter of the tapped hole and, more typically, no greater than about ¾ of the diameter. In some embodiments, the spacing between the plugging heads 20A & B or sealing elements 30A & B may be in a range of ¾× to 2× or 1× to 2× that of the tapped hole diameter, there being discrete values and subranges within these broader ranges.

Figures 7, 17:
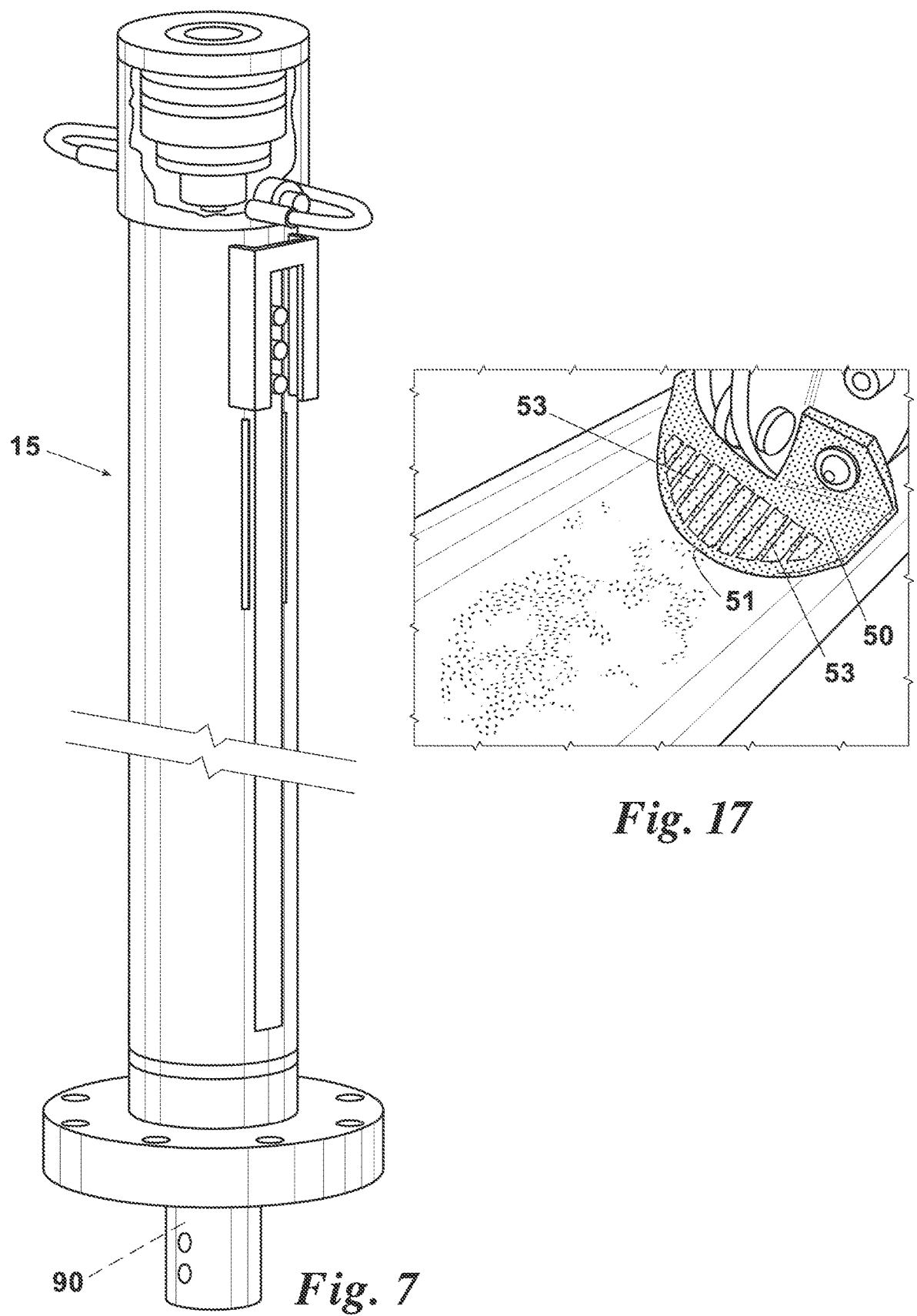
FIG. 7 is an embodiment of an actuator assembly of this disclosure. The actuator inserts and retracts the plugging heads into the pipe, while also internally transferring hydraulics into the plugging heads to activate them once inserted.
FIG. 17 is an embodiment of a sweep of this disclosure in a flexed state during sweeping. The sweep includes a plurality of ribs that help reduce friction.

The secondary plugging head 20B may also include an expandable seal 30B and the first and second seal-facing surfaces 61, 41. In some embodiments, the secondary plugging head 20B also includes a flexible sweep 50 connected to a lowermost end 28 of the secondary plugging head 20B. See FIGS. 1 & 17. The sweep 50 may be a urethane material. In embodiments the sweep 50 has a curved lower end or edge 51. The sweep 50 be formed as a semi-circular disc or may have an elliptical shape. In some embodiments, the sweep includes a plurality of ribs 53 that help reduce friction during sweeping as well as provide strength. The sweep 50 may also be incorporated into a single plugging head 20 embodiment. Referring to FIGS. 9A-D, when in use, a lower end or edge 51 of the sweep 50 is located below and trailing the plugging head 20 (at least initially during rotation) and sweeps chips forward and away from the head 20 as the head 20 rotates and moves axially into a sealing position. The sweep 50 may then return to a vertical position and lie perpendicular to longitudinal axis of the pipe.

Referring now to FIGS. 5A & B, the hinge 23A of the primary plugging head 20A may include a pin 70 containing longitudinally extending passageways 71 and laterally extending fluid passageways 73 in communication with the longitudinally extending fluid passageways 71A. In some embodiments, the pin 70 includes three longitudinally extending passageways, one passageway 71A configured for the primary plugging head 20A, another passageway 71B configured for the secondary plugging head 20B, and the third passageway 71C configured for bleeding the area or volume between the two heads 20A & B. The laterally extending fluid passageways 73 may each include a port 75 contained in a respective circumferential groove 77 of the pin 70, contained by o-rings 79 on each side of the grooves 77. The hinge 23B of the secondary plugging head 20B may also include a pin 70 containing a longitudinally extending passageway 71 and a laterally extending fluid passageway 73 in communication with it. The pin 70 of the secondary plugging head 20B may also include circumferential grooves 77, contained by o-rings 79 on each side of the grooves 77, into which the lateral extending fluid passageways 73 exit. The primary and secondary hinge pins 23A & B have at least one longitudinally extending fluid passageway 71 in communication with one another (e.g. the secondary plugging head passageway).

Figure 4:
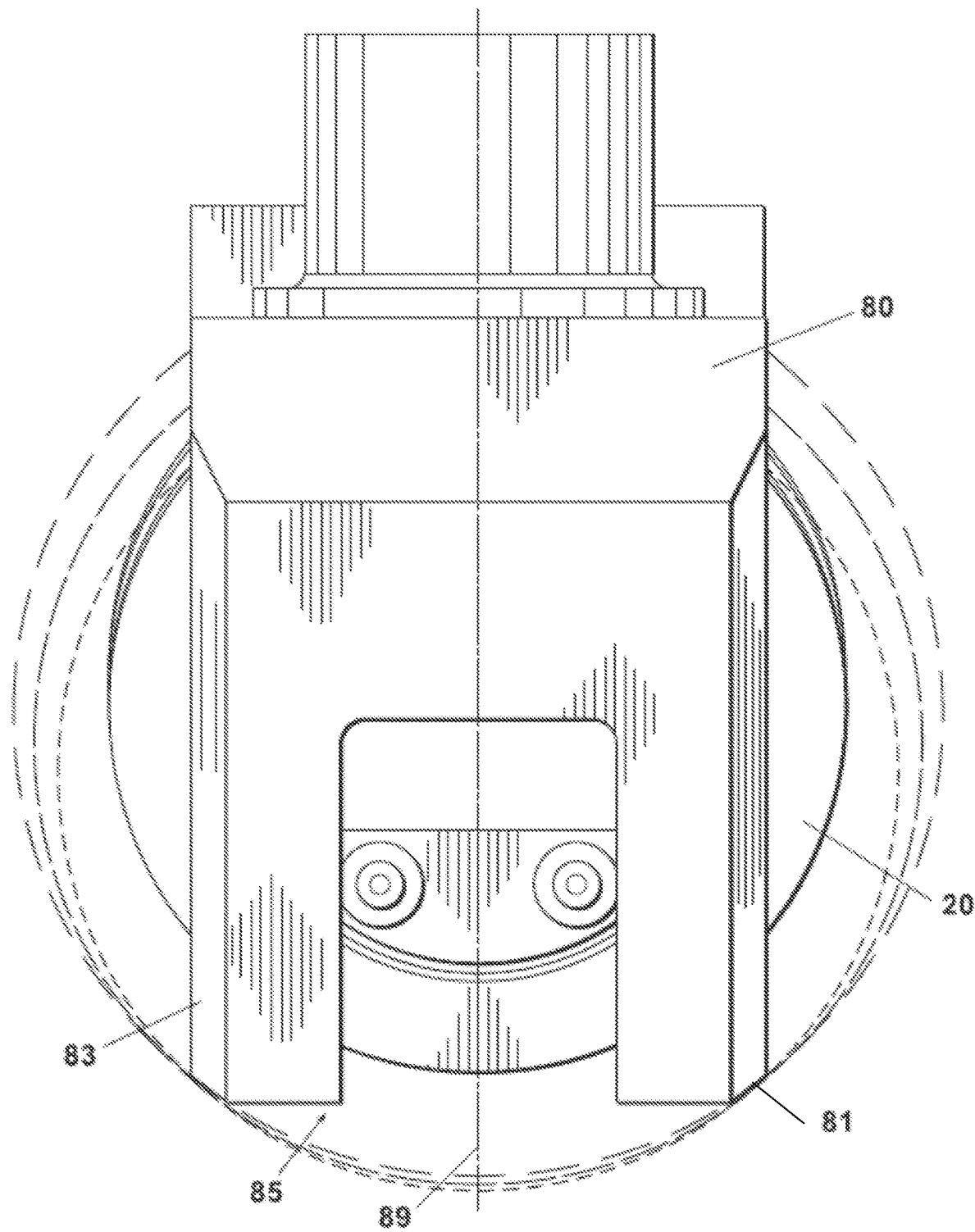
FIG. 4 is an end view of an embodiment located within an interior space of a pipe. The feet of the control bar head rest on the side of the inside diameter of the pipe to secure the primary and secondary plugging heads in the line. By way of a non-limiting example SCH 10, SCH 40, and SCH 80 pipe inside diameters are shown.
Figure 6:
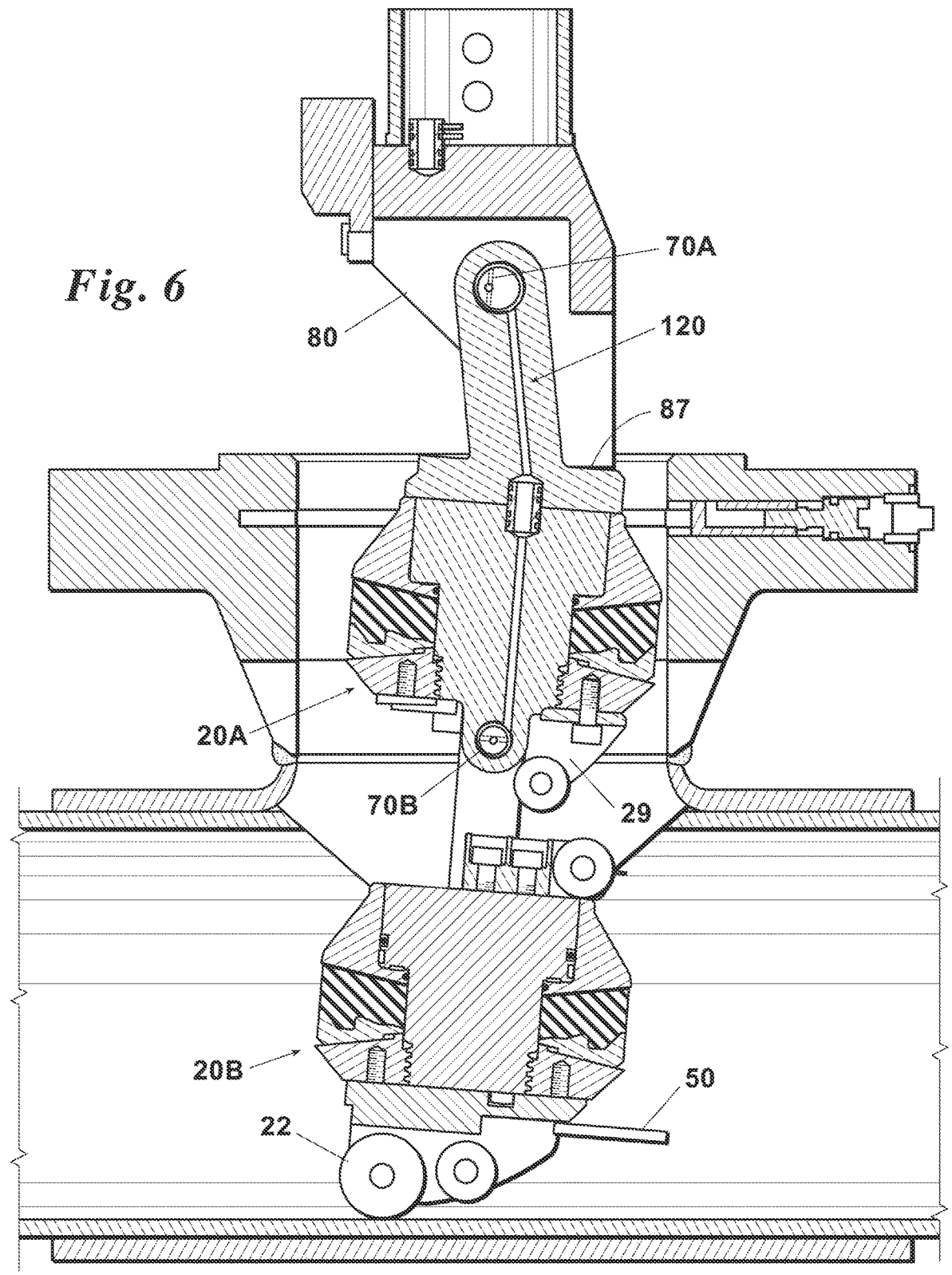
FIG. 6 is a cross-section view of an embodiment of an isolation plug of this disclosure as it travels downward through a lateral access pipe into the line. Hard stops control plugging head movement for smoother insertion. The feet of the control bar head act as a hard stop for the primary plugging head by contacting the primary plugging head hinge, restricting the plugging head' movement. The head's guide then contacts second plugging head hinge, restricting this plugging head's movement.

Referring to FIG. 4, in some embodiments of the pipeline isolation tool 10, the control bar head 80 may include a pair of spaced-apart legs or feet 81 located at a lower end 83 of the control bar head 80, one foot 81A of the pair lying left of a vertical centerline 89 of the control bar head 80 and another foot 81B of the pair lying right of the vertical centerline 89. When in an intended use, each foot 81 of the pair of spaced-apart feet rests on a sidewall portion of a pipe. (Unlike prior art control bar heads that do not include feet and are configured to rest on a bottom of the pipe.) The use of the feet 81 prevent the bottom 85 of control bar head 80 from resting or sitting on any chips or debris that result from a tapping operation. Other spacings may be used where appropriate. By securing to the side of the pipe, the primary plugging head hinge 23 may be made narrower for easier insertion and retraction.

Referring to FIGS. 4, 15 & 16A-C, due to pipe wall thickness variance, the control bar head 80 does not necessarily locate such that the centerline 36 of the seal 30 aligns with the centerline of the pipe. Therefore, the seal 30 must overcome axial misalignment and provide effective isolation. In some embodiments, the seal 30 is capable of isolating with an off-axis angle in a range of at least 4° in order to overcome axial misalignment due to pipe wall thickness variance. Other off-axis angles may be accommodated.

For purposes of this disclosure, when referring to the placement of the control bar feet 81, the bottom of the pipe is that lowermost portion of the pipe lying in an arc in a range of a +5° to −5°, +10° to −10°, or +15° to −15° relative to the dead center bottom point (0°) defined by the vertical centerline of the pipe, there being discrete values and subranges within the broader ranges.

Figure 8C:
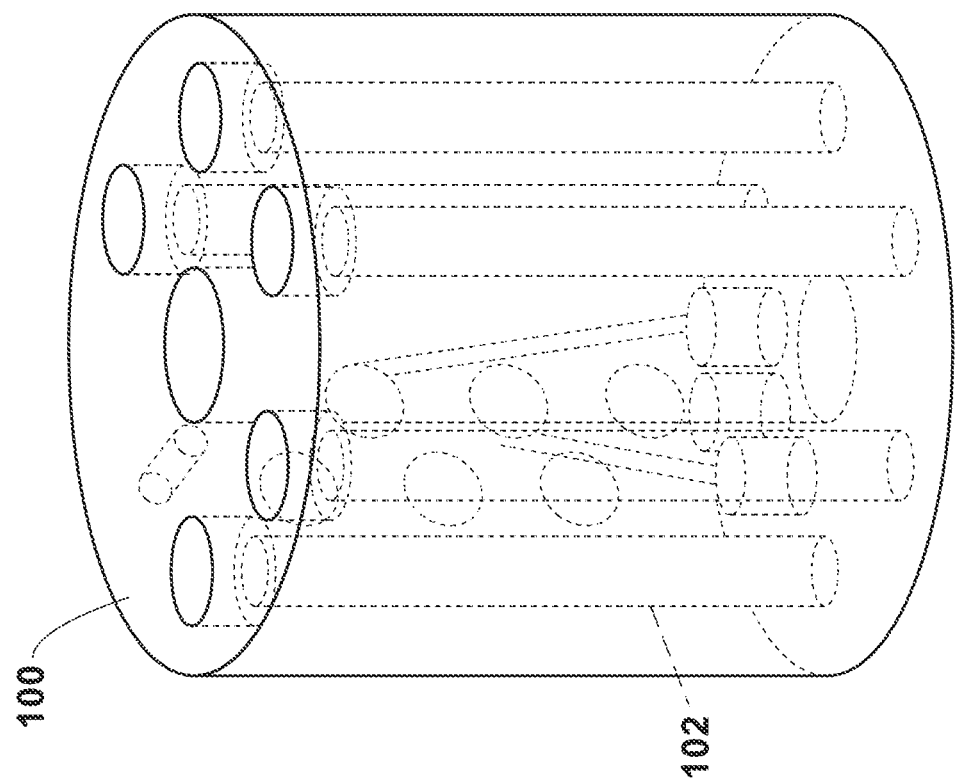
FIG. 8C is an embodiment of a connection between the top of the control bar and the feed nut, which has three holes for fittings that lead into the hydraulic lines. In embodiments, two of the holes may connect to a hydraulic pump to activate the seals, while a third may connect to a hose that can be moved away from the site for safe bleed of the isolation volume located between the seals.
Figure 8B:
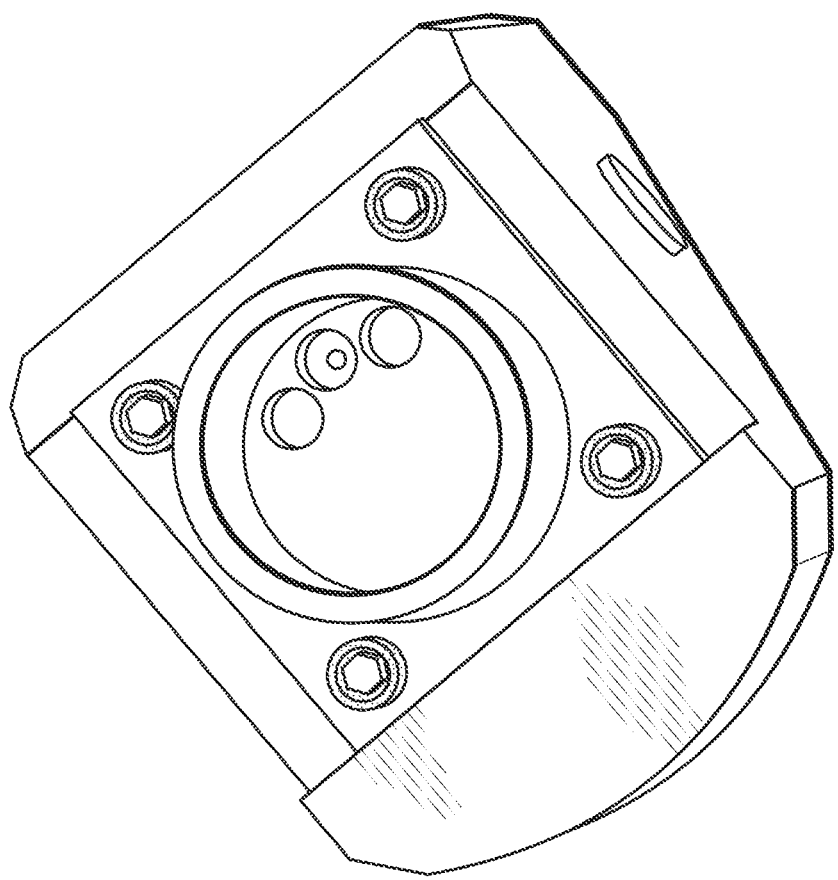
FIG. 8B is an embodiment of a connection between the bottom end of the control bar and the top of the control bar head.
Figure 9B:
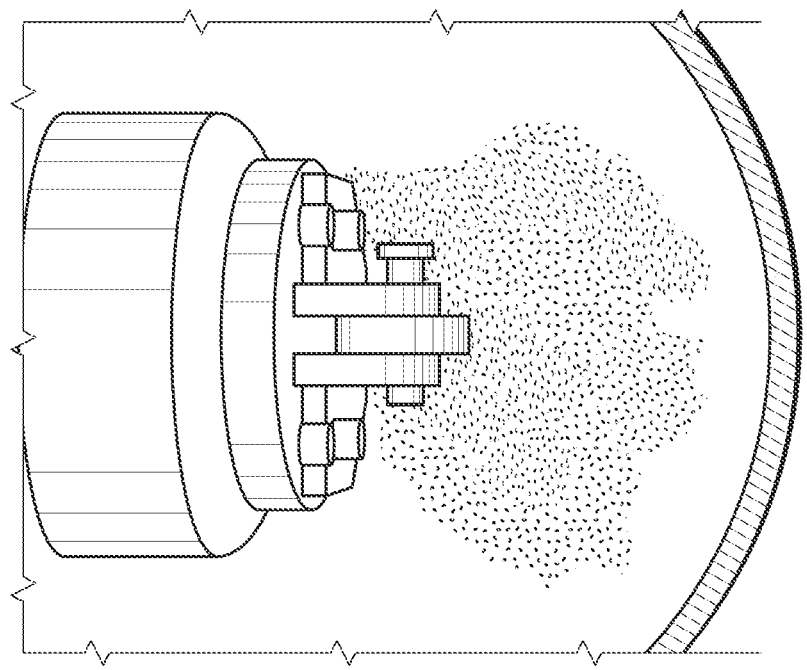
FIG. 9B is the tool of FIG. 9A as the sweep pushes the chips and debris forward of the tool as the tool continues its axial travel. The sweep transitions between being flexed rearward and being flexed forward. When moving between the two, the sweep can fling the chips and debris downstream of the tool.
Figure 9A:
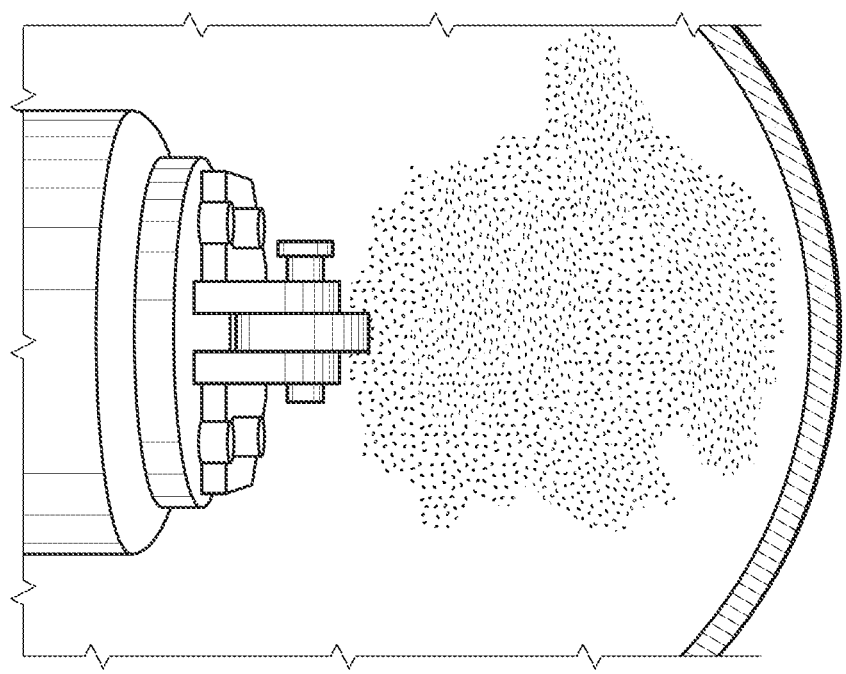
FIG. 9A is embodiment illustrating the tool as it is approaches chips and debris. After a hot tapping operation, a pile of chips fall to the bottom of the pipe underneath the tapped hole. As the tool of this disclosure is inserted into the pipe and advanced axially into a sealing position, the sweep, which may comprise urethane, sweeps the chips and debris down the pipe and away from the sealing surfaces. Initially, the sweep can be flexed in a rearward direction under the plugging head, its face surface oriented toward the bottom of the pipe.
Figure 9D:
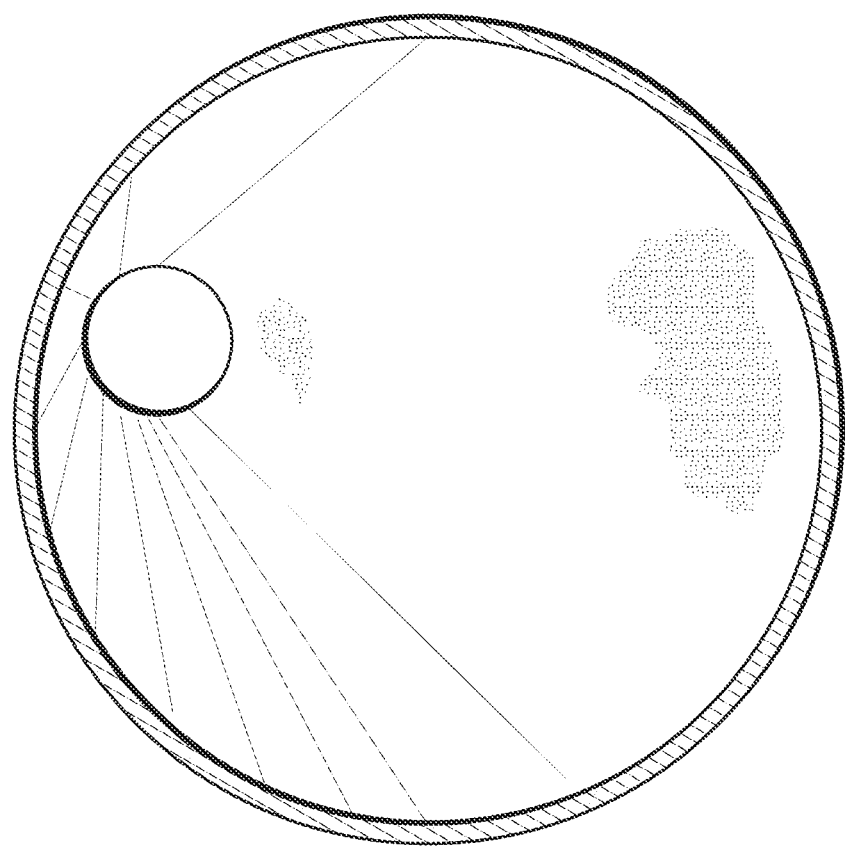
FIG. 9D is an illustration of the interior of the pipe looking in a direction toward the access hole after the sweep has cleared the chips and debris. The area between the two piles of chips and debris is where the tool of this disclosure would reside.
Figure 9C:
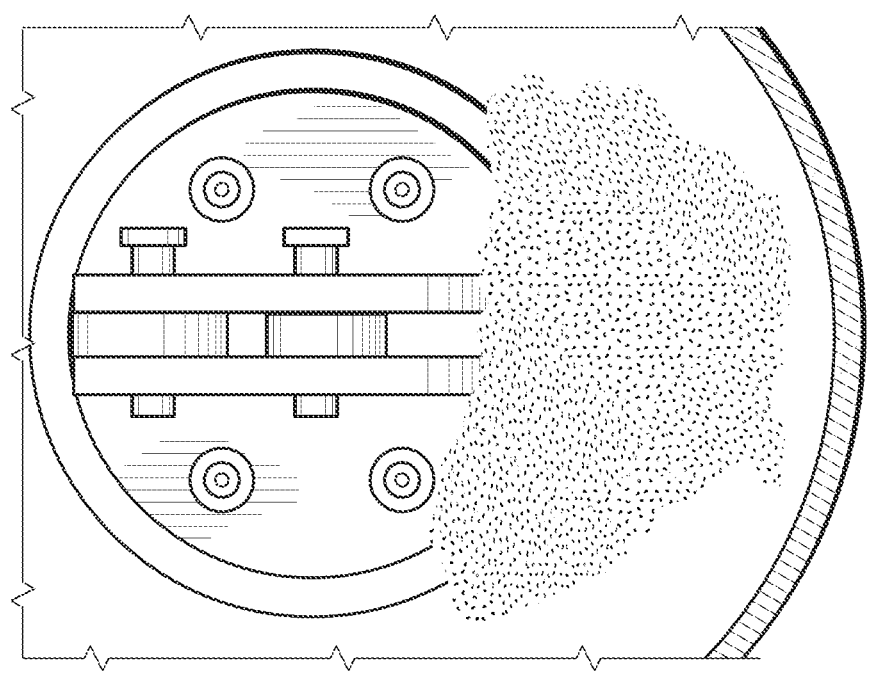
FIG. 9C is the tool of FIG. 9A as the sweep clears chips and debris away from the sealing surface of the pipe. The sweep can be flexed in a forward direction, similar to that of FIG. 17. Multiple runs may be made to ensure the sealing surfaces are clear of chips and debris.
Figure 10A:
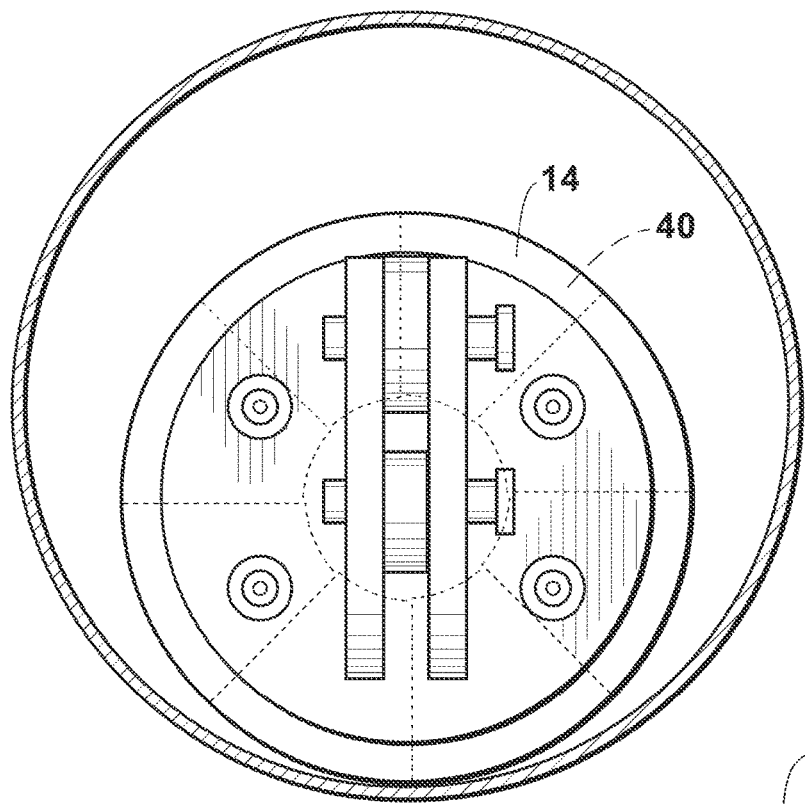
FIG. 10A is an embodiment of a sealing element of this disclosure in an unexpanded state. Metal support segments are configured to slide radially outward with the seal.
Figure 10B:
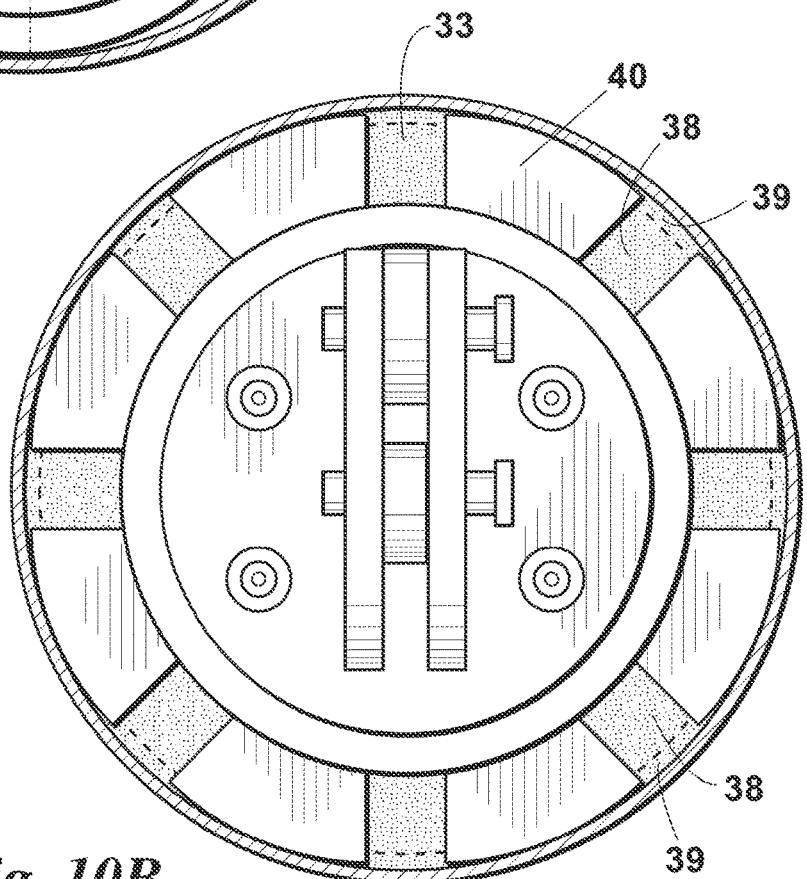
FIG. 10B is an embodiment of a sealing element of this disclosure in an expanded state. The metal support segments slide radially outward with the seal, supporting the seal against differential pressure.

In embodiments of the pipeline isolation tool 10, no external fluid passageway is used to convey the fluid that actuates axial movement of the first seal-facing surface 61. For example, in addition to the fluid passageways previously described, the tool may include a control bar 90 containing a plurality of longitudinally extending fluid passageways 91, with a feed nut 100 located at its upper end 93 and the control bar head 80 located at its lower end 95. See FIGS. 7-8C. The feed nut 100 and control bar head 80 may also contain longitudinally extending fluid passageways 18, 102 complementary to passageways 91 of the control bar 90. In embodiments, the feed nut 100, control bar 90, and control bar head 80 include three fluid passageways: one for the primary plugging head 20A, one for the secondary plugging head 20B, and one for bleeding the annulus between the two heads 20A & B. Transfer pins 16 located between the control bar 90 and the feed nut 100 and between the control bar 90 and the control bar head 80 facilitate the transfer of fluid between the components. A similar transfer pin 16 may be located in the fluid circuit 120 of the plugging head 20. Unlike transfer pins 70, which permit pivoting motion between components, transfer pin 16 does not.

In embodiments, the expandable seal 30, which may be made of an elastomeric material, has a seal unset diameter and a (larger) seal set diameter. In some embodiments, the seal set diameter may be in a range of 1.13 to 1.30 times greater than that of the seal unset diameter, there being discrete values and sub-ranges within this larger range. The seal sets and unsets as the first and second seal-facing surfaces 61, 41 move toward and away from one another. In embodiments, the first seal-facing surface 61 moves axially but not transversely. The second seal-facing surface 41 moves transversely but not axially.

The seal 30 may be dual durometer seal having a larger (thicker) band 38 of harder core material that provides adequate structure to the seal and a smaller (thinner) band 39 of softer outer material that conforms to pipe irregularities such as, but not limited to, weld seams, corrosion, pitting, and debris. A shore hardness of an inner portion or larger band 38 of the elastomer seal 30 may be greater than a shore hardness of an outer portion or smaller band 39 of the elastomer seal 30, shore hardness being measured on a same scale. In some embodiments, the soft outer diameter (thinner band 39) of the seal has a thickness between 3%-5% of the hard outside diameter (thicker band 38) of the isolation tool 10, there being discrete values and subranges within this broader range. Other thicknesses and ratios of thicknesses may be used where appropriate.

The first seal-facing surface 61 may be a cylinder or plate 63 having a profile that presents an inclined surface 65 extending an entire vertical distance between an upper and lower end 67, 69 of the seal-facing surface 61. The second seal-facing surface 41 may be a plate 46 and include upwardly inclined surfaces 43A-D that function as thrust surfaces and run substantially parallel to that of the first seal-facing surface 61. In embodiments, this portion 43A-D of the second seal-facing surface 41 may include two different thrust surfaces. A cavity or recessed portion 45 may be located toward the upper end 44 of the second seal-facing surface 41 and include another thrust surface for radial movement outward and another one for radial movement inward. This cavity or recessed portion 45 may be quadrilateral-shaped in cross-section. In some embodiments, the vertical height $V_C$ of the cavity or recess 45 is proportional to an overall vertical height $V_T$ of the entire seal-facing surface 41. A horizontal length $H_B$ of the bottom end 48 of the cavity 45 may be proportional to a horizontal spacing $H_S$ between the lower end 69, 47 of the first and second seal-facing surfaces 61, 41.

The steel components of the tool 10 may be machined. The seals 30 may be compression molded dual durometer rubber. Assembly of the tool 10 may use mostly threaded fasteners or parts and coiled snap rings.

Embodiments of a pipeline isolation tool 10 of this disclosure may include one or more of the following features and combination of features:

1. An internal actuating fluid circuit 120 that runs through a control bar head 80 and a plugging head hinge 23 to a fluid-actuated piston-and-cylinder arrangement 60 of a plugging head 20.
2. A plugging head 20 that includes a first plate 63 configured for axial movement and a second plate 46 configured for transverse movement substantially radially outward and inward as a seal 30 of the plugging head 20 moves between an unset and set state.
3. A second plate 46 that includes a plurality of upwardly inclined surfaces 43 that function as thrust surfaces.
4. A second plate 46 that includes at least one thrust surface 43 running substantially parallel to a seal-facing surface 61 of the first plate 63 and another thrust surface 43 running non-parallel to that same seal-facing surface 61.
5. A plugging head 20 that includes a hinge 23, which may be in the form of a yoke, that contains a transfer pin 70 that includes one or more fluid passageways 71, 73.
6. A plugging head 20 including an expandable seal 30 located between and in contact with a first and a second seal-facing surface 61, 41.
7. A plugging head 20 including a first seal-facing surface 61 configured for longitudinal or axial movement between a seal unset and a seal set position.
8. A plugging head 20 including a second seal-facing surface 41 configured for transverse movement between the seal unset and set positions.
9. A secondary plugging head 20B in pivotal relation to the primary plugging head 20A.
10. A hinge or joint 23 that includes a transfer pin 70 with longitudinally extending passageways 71 and laterally extending passageways 73 in communication with the longitudinally extending passageways 71.
11. A transfer pin 70 that includes a plurality of circumferential grooves 77, wherein one or more laterally extending fluid passageways 73 each include a port 75 contained in a respective groove 77 of the plurality of grooves 77.
12. A transfer pin 70 that includes circumferential grooves 77 contained by o-rings 79 located on either side of the groove 77.
13. A transfer pin 70 wherein at least one of the longitudinally extending fluid passageways 71 is configured to provide fluid to a primary plugging head 20A and another of the longitudinally extending fluid passageways 71 is configured to provide hydraulic fluid to a secondary plugging head 20B.
14. A transfer pin 70 wherein one of the longitudinally extending fluid passageways 71 is configured as a bleed passageway for a volume located between a primary and a secondary plugging head 20A & B.
15. A transfer pin 70 located between adjacent components, the transfer pin 70 including a longitudinal passageway 71 and o-rings 79.
16. A fluid-activated cylinder 64 that contains a first seal-facing surface 61.
17. A plurality of spaced-apart metal support segments 40, each metal support segment 40 containing a second seal-facing surface 41.
18. A plurality of metal support segments 40 configured to move transversely as the seal 30 moves between an unset and a set position.
19. Metal support segments 40 where in the unset position the sides of adjacent segments touch one another and in the set positions the segments 40 become spaced apart such that at least a portion of the sides do not touch one another.
20. Metal support segments 40 where in the seal unset position a lesser portion of the seal 30 is between adjacent segments than is exposed when in the seal set position.
21. A first seal-facing surface 61 that presents an inclined surface to the seal.
22. A first seal-facing surface 61 that is planar along its entire length.
23. A first seal-facing surface 61 that is an inclined planar surface that runs the entire distance between a top and bottom end 67, 69 of the seal-facing surface 61.
24. A second seal-facing surface 41 that is non-linear, at least in part, along its entire length.
25. A second seal-facing surface 41 that includes at least two portions 43, 45 that do not extend the entire distance between the top and bottom ends 44, 47 of the seal-facing surface 41 and run at different angles than one another relative to vertical.

26. A second seal-facing surface 41 that includes two or more different upwardly inclined surfaces 43 at different locations along its length.
27. A second seal-facing surface that has a lower portion 47 that runs generally parallel to that of the first seal-facing surface 61 and an upper portion 44 that, at least in part, runs non-parallel to the first seal-facing surface 61.
28. A second seal-facing surface 41 that includes at least two thrust surfaces 43 along a lower half 42 of the seal-facing surface.
29. A second seal-facing surface 41 that includes a cavity 45 into which part 35 of the expandable seal 30 resides when in the seal unset and set positions.
30. A second seal-facing surface 41 in which at least one thrust surface 43 forms an upper end 49 of the cavity 45.
31. A second seal-facing surface 41 that includes a quadrilateral-shaped cavity 45.
32. A second seal facing surface 41 wherein a vertical height of the cavity or recess 45 is proportional to an overall vertical height of the seal-facing surface 41.
33. A second expandable seal-facing surface 41 wherein a horizontal length of a bottom end 48 of the cavity 45 is proportional to a horizontal spacing between the first and second seal-facing surfaces 61, 41.
34. An expandable seal 30 made of an elastomeric material.
35. An expandable seal 30 having a seal set diameter in a range of 1.13 to 1.3 times greater than that of a seal unset diameter.
36. An expandable seal 30 that is a dual durometer seal.
37. An expandable seal 30 that includes a harder core inner portion 38 for support and a softer outer portion 39 to conform to the pipe wall.
38. An expandable seal 30 having a shore hardness of an inner band portion 38 of the elastomer seal 30 greater than a shore hardness of an outer band portion 39 of the elastomer seal 30, shore hardness being measured on a same scale.
39. A secondary plugging head 20B including an expandable seal 30B and a second plugging head hinge 23B containing a transfer pin 70.
40. A control bar head 80 that includes a pair of spaced-apart feet 81 located at a lower end of the control bar head 80, one foot 81 of the pair lying left of a vertical centerline of the control bar head 80 and another foot 81 of the pair lying right of the vertical centerline.
41. A control bar head 80 wherein when in an intended use, each foot 81 of the pair of spaced-apart feet rests on a sidewall portion of a pipe.
42. A control bar head 80 wherein no portion of the head 80 rests on a bottom of the pipe.
43. A feed nut 100 configured to receive an upper end 93 of the control bar 90, the feed nut 100 containing a plurality of fluid passageways 91 complementary to those of the control bar 90.
44. A control bar head 80 configured to receive a lower end 95 of the control bar 90, the control bar head 80 containing a plurality of fluid passageways 82 complementary to those of the control bar 90.
45. A control bar head 80 including a primary plugging head stop 87 configured to orient the primary plugging head 20A in a predetermined non-vertical orientation during run-in and place it a proper angle for rotation into a sealing position.
46. A primary plugging head guide 22 including a secondary plugging head stop 29 configured to orient the secondary plugging head 20B in a predetermined non-vertical orientation during run-in and place it at a proper angle for rotation into a sealing position.
47. A sweep 50 located at a forward end 11 the tool 10.
48. A sweep 50 that is flexible, its lower end or edge 51 located below and trailing the plugging head 20 (at least initially during rotation) and sweeps chips forward and away from the head 20 as the head 20 rotates and moves axially into a sealing position.
49. A sweep 50 made of a urethane material.
50. A sweep 50 that includes a curved lower end or edge 51.
51. A sweep 50 that is located at a lower end 21 of a plugging head 20.
52. A sweep 50 that includes a plurality of ribs 53.

While embodiments have been described, an isolation tool of this disclosure is defined by the following claims. The claims include the full range of equivalents to which each recited element is entitled.

The invention claimed is:
1. A pipeline isolation tool [10] comprising:
at least one plugging head [20] including a seal [30] expandable between an unset and a set position;
a plurality of metal support segments [40] located on a side of the seal and moveable in a transverse direction radially outward and inward as the seal moves between the unset and set positions;
each metal support segment of the plurality including a seal-facing surface [41] including at least two inclined thrust surfaces [43A, 43B, 43C] and a concave-portion [45] containing one of the at least two inclined thrust surfaces, a portion [35] of the side of the seal residing within the concave portion when in the unset and set positions;
wherein in the unset position a portion [33] of the seal is covered by adjacent metal support segments of the plurality; and
wherein in the set position the portion of the seal is exposed between the adjacent metal support segments.
2. The pipeline isolation tool of claim 1, further comprising:
the at least one plugging head including a sweep [50] having a curved lower end [51].
3. The pipeline isolation tool of claim 2, further comprising:
the curved lowered end of the sweep being located below the at least one plugging head when the seal is in an unset position and forward of the at least one plugging head when the seal is in the set position.
4. The pipeline isolation tool of claim 2, further comprising:
the sweep including a plurality of ribs [53].
5. The pipeline isolation tool of claim 1, further comprising:
a hinge [23] containing a transfer pin [70] including a plurality of fluid passageways [71, 73], the at least one plugging head being in pivotal relation to the hinge.
6. The pipeline isolation tool of claim 5, further comprising:
at least one fluid passageway of the plurality of fluid passageways being a hydraulic fluid passageway; and
at least one other fluid passageway of the plurality of fluid passageways being a gas or liquid passageway.

7. The pipeline isolation tool of claim 1, further comprising:
  the seal including
    an outer pipe wall facing portion [39] having a first shore hardness; and
    another portion [38] inward of the outer pipe wall facing portion having a second shore hardness greater than the first shore hardness.

8. The pipeline isolation tool of claim 1, further comprising:
  a control bar head [80] connected to the at least one plugging head, the control bar head including a pair of spaced-apart feet [81] located at a lower end [83] of the control bar head, one foot of the pair lying left of a vertical centerline [89] of the control bar head and another foot of the pair lying right of the vertical centerline.

9. The pipeline isolation tool of claim 8, further comprising:
  the control bar head including a stop [87] configured to orient the at least one plugging head in a first orientation during run-in to an interior of a pipe and at second different orientation when in the pipe.

10. The pipeline isolation tool of claim 8, further comprising a second plugging head [20B] in pivotal relation to the at least one plugging head.

11. The pipeline isolation tool of claim 1, further comprising a fluid-activated cylinder [64] located on an opposite side of the seal, the fluid-activated cylinder moveable in an axial direction toward the seal.

12. The pipeline isolation tool of claim 11, further comprising the fluid-activated cylinder including a seal-facing surface [61] oriented at an incline to the opposite side of the seal.

13. The pipeline isolation tool of claim 12, wherein the seal-facing surface of the fluid-activated cylinder [64] is planar along its entire length.

14. The pipeline isolation tool of claim 12, the seal-facing surface of the metal segment includes a lower portion [47] that runs parallel to the seal-facing surface of the fluid-activated cylinder and an upper portion [44] that runs non-parallel to the seal-facing surface of the fluid-activated cylinder.

15. The pipeline isolation tool of claim 1, wherein a horizontal length of a bottom end [48] of the concave portion is proportional to a horizontal spacing between the seal-facing surface of the metal segment and the seal-facing surface of the fluid-activated cylinder.

16. The pipeline isolation tool of claim 1, further comprising the seal-facing surface of the metal segment including a top and a bottom end [44, 47] and at least two portions [43, 45] that do not extend an entire distance between the top and bottom ends and run at different angles than one another relative to vertical.

17. The pipeline isolation tool of claim 1, wherein the at least two inclined thrust surfaces have different inclines.

18. The pipeline isolation tool of claim 1, the one of the at least two inclined thrust surfaces forms an upper end [49] of the concave portion.

19. The pipeline isolation tool of claim 1, wherein another one of the at least two inclined thrust surfaces is located on a lower half [42] of the seal-facing surface.

20. The pipeline isolation tool of claim 1, wherein a vertical height of the concave portion is proportional to an overall vertical height of the seal-facing surface 41 of the metal segment.

21. The pipeline isolation tool of claim 1, wherein the concave portion is a quadrilateral-shaped cavity.

22. A plugging head [20] adapted for use in pipeline isolation, the plugging head comprising:
  a seal [30] sized to engage a pipe wall and having an unset position and a set position;
  a plurality of metal support segments [40] located on a side of the seal and moveable between the unset and set positions in a transverse direction radially outward and inward;
  each metal support segment of the plurality including a seal-facing surface [41] including at least two inclined thrust surfaces [43A, 43B, 43C] and a concave-portion [45] containing one of the at least two inclined thrust surfaces, a portion [35] of the side of the seal residing within the concave portion when in the unset and set positions;
  wherein in the unset position a portion [33] of the seal is covered by adjacent metal support segments of the plurality; and
  wherein in the set position the portion of the seal is exposed between the adjacent metal support segments.

23. The plugging head of claim 22, wherein in the unset position, each metal support and the seal, together, have a substantially trapezoidal, but not parallelogrammatic, cross-section.

24. The plugging head of claim 22, further comprising a third inclined thrust service, the third inclined thrust surface and another one of the at least two inclined thrust surfaces located below the concave portion.

* * * * *